US007992096B1

(12) United States Patent
Davis

(10) Patent No.: US 7,992,096 B1
(45) Date of Patent: Aug. 2, 2011

(54) DATA BROWSING METHOD AND SYSTEM FOR USER INTERFACE

(75) Inventor: Mark Davis, Mill Valley, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1093 days.

(21) Appl. No.: 10/616,091

(22) Filed: Jul. 8, 2003

Related U.S. Application Data

(60) Provisional application No. 60/467,794, filed on May 1, 2003.

(51) Int. Cl.
G06F 3/048 (2006.01)
H04M 1/00 (2006.01)

(52) U.S. Cl. ......... 715/781; 715/810; 715/808; 715/963

(58) Field of Classification Search ............ 715/781, 715/963, 810, 808; 455/566
See application file for complete search history.

(56) References Cited

U.S. PATENT DOCUMENTS

| | | |
|---|---|---|
| 4,279,021 A | 7/1981 | See et al. |
| 4,415,065 A | 11/1983 | Sandstedt |
| 4,587,630 A | 5/1986 | Straton et al. |
| 4,725,694 A | 2/1988 | Auer et al. |
| 4,764,770 A | 8/1988 | Church |
| 4,887,212 A | 12/1989 | Zamora et al. |
| 4,892,981 A | 1/1990 | Soloway et al. |
| 4,916,441 A | 4/1990 | Gombrich |
| 5,010,547 A | 4/1991 | Johnson et al. |
| 5,012,219 A | 4/1991 | Henry |
| D320,598 S | 10/1991 | Auerbach et al. |
| 5,067,164 A | 11/1991 | Denker et al. |
| 5,075,684 A | 12/1991 | DeLuca |
| 5,101,439 A | 3/1992 | Kiang |
| 5,109,539 A | 4/1992 | Inubushi et al. |
| D326,451 S | 5/1992 | Roegner |
| 5,218,188 A | 6/1993 | Hanson |
| 5,227,614 A | 7/1993 | Danielson et al. |
| 5,235,561 A | 8/1993 | Seager |
| 5,307,086 A * | 4/1994 | Griffin et al. ............... 715/808 |
| 5,334,824 A | 8/1994 | Martinez |
| 5,335,276 A | 8/1994 | Thompson et al. |
| 5,336,001 A | 8/1994 | Lichtenberg |
| 5,345,615 A | 9/1994 | Garofalo |
| 5,357,065 A | 10/1994 | Mitamura et al. |
| 5,359,317 A | 10/1994 | Gomez et al. |
| 5,379,057 A | 1/1995 | Clough et al. |
| 5,381,387 A | 1/1995 | Blonder et al. |
| 5,392,447 A | 2/1995 | Schlack et al. |

(Continued)

FOREIGN PATENT DOCUMENTS

EP 0149762 A1 7/1986

(Continued)

OTHER PUBLICATIONS

Bill Dyszel, Handspring Visor for Dummies, 2000, IDG Books Worldwide, Inc., p. 13, 15, 121, 122, 123, 208.*

(Continued)

Primary Examiner — Ting Lee

(57) ABSTRACT

Embodiments of the present invention relate to methods and devices for graphically managing and manipulating calendar data in a database, in a weekly view and in a monthly view. In either mode, a highlighted element is selected thereby causing a preview window to pop-up to display appointment details. The preview window and the image of the week or the month are displayed simultaneously.

18 Claims, 18 Drawing Sheets

U.S. PATENT DOCUMENTS

| | | |
|---|---|---|
| 5,394,140 A | 2/1995 | Wong et al. |
| D359,920 S | 7/1995 | Sakamoto |
| 5,440,629 A | 8/1995 | Gray |
| 5,442,406 A | 8/1995 | Altmanshofer et al. |
| 5,465,401 A | 11/1995 | Thompson |
| 5,494,363 A | 2/1996 | Hochgesang |
| 5,503,484 A | 4/1996 | Louis |
| 5,510,808 A | 4/1996 | Cina, Jr. |
| 5,584,054 A | 12/1996 | Tyneski et al. |
| 5,612,682 A | 3/1997 | DeLuca et al. |
| 5,619,555 A | 4/1997 | Fenton et al. |
| 5,627,978 A | 5/1997 | Altom et al. |
| 5,650,776 A | 7/1997 | Mitchell et al. |
| 5,705,995 A | 1/1998 | Laflin et al. |
| 5,719,936 A | 2/1998 | Hillenmayer |
| 5,742,894 A | 4/1998 | Jambhekar et al. |
| 5,745,904 A | 4/1998 | King et al. |
| 5,754,636 A | 5/1998 | Bayless et al. |
| 5,779,030 A | 7/1998 | Ikegami et al. |
| 5,797,089 A | 8/1998 | Nguyen |
| 5,797,098 A | 8/1998 | Schroeder et al. |
| 5,809,115 A | 9/1998 | Inkinen |
| 5,812,651 A | 9/1998 | Kaplan |
| 5,813,778 A | 9/1998 | Shi |
| 5,815,142 A | 9/1998 | Ailard et al. |
| 5,848,356 A | 12/1998 | Jambhekar et al. |
| 5,860,074 A | 1/1999 | Rowe et al. |
| 5,873,108 A | 2/1999 | Goyal et al. |
| 5,903,852 A | 5/1999 | Schaupp, Jr. et al. |
| 5,917,905 A | 6/1999 | Whipple et al. |
| 5,917,906 A | 6/1999 | Thornton |
| 5,922,071 A | 7/1999 | Taylor et al. |
| 5,941,648 A | 8/1999 | Robinson et al. |
| 5,949,764 A | 9/1999 | Yoshida et al. |
| 5,958,006 A | 9/1999 | Eggleston et al. |
| 5,974,334 A | 10/1999 | Jones, Jr. |
| D416,256 S | 11/1999 | Griffin et al. |
| 6,002,944 A | 12/1999 | Beyda |
| 6,006,109 A | 12/1999 | Shin |
| 6,009,338 A * | 12/1999 | Iwata et al. ................ 455/575.4 |
| 6,016,142 A | 1/2000 | Chang et al. |
| 6,018,571 A | 1/2000 | Langlois et al. |
| 6,029,072 A | 2/2000 | Barber |
| 6,035,214 A | 3/2000 | Henderson |
| 6,055,439 A | 4/2000 | Helin et al. |
| 6,058,304 A | 5/2000 | Callaghan et al. |
| 6,064,734 A | 5/2000 | Hasegawa et al. |
| 6,084,951 A | 7/2000 | Smith et al. |
| 6,097,391 A | 8/2000 | Wilcox |
| 6,101,531 A | 8/2000 | Eggleston et al. |
| 6,119,179 A | 9/2000 | Whitridge et al. |
| 6,133,916 A | 10/2000 | Bukszaar et al. |
| 6,137,469 A | 10/2000 | Wu et al. |
| 6,157,630 A | 12/2000 | Adler et al. |
| 6,166,342 A | 12/2000 | Chou |
| 6,169,911 B1 | 1/2001 | Wagner et al. |
| 6,188,917 B1 | 2/2001 | Laureanti |
| 6,192,118 B1 | 2/2001 | Bayless et al. |
| 6,198,053 B1 | 3/2001 | Chou |
| 6,208,879 B1 | 3/2001 | Iwata et al. |
| 6,215,865 B1 | 4/2001 | McCalmont |
| 6,233,469 B1 | 5/2001 | Watanabe |
| 6,243,452 B1 | 6/2001 | O'Shaughnessey et al. |
| 6,256,631 B1 | 7/2001 | Malcolm |
| 6,259,449 B1 | 7/2001 | Saxena et al. |
| 6,262,716 B1 | 7/2001 | Raasch |
| 6,295,372 B1 | 9/2001 | Hawkins et al. |
| 6,297,795 B1 | 10/2001 | Kato et al. |
| 6,297,945 B1 | 10/2001 | Yamamoto |
| 6,310,609 B1 | 10/2001 | Morgenthater |
| 6,317,313 B1 | 11/2001 | Mosgrove et al. |
| 6,317,781 B1 | 11/2001 | De Boor et al. |
| 6,333,973 B1 | 12/2001 | Smith et al. |
| D454,349 S | 3/2002 | Makidera et al. |
| 6,370,018 B1 | 4/2002 | Miller, Jr. et al. |
| D456,794 S | 5/2002 | Laverick et al. |
| 6,389,124 B1 | 5/2002 | Schnarel et al. |
| 6,405,172 B1 | 6/2002 | Baker et al. |
| 6,414,679 B1 * | 7/2002 | Miodonski et al. ........... 345/420 |
| 6,415,138 B2 | 7/2002 | Sirola et al. |
| 6,442,263 B1 | 8/2002 | Beaton et al. |
| D462,354 S | 9/2002 | Kimbre et al. |
| 6,452,588 B2 | 9/2002 | Griffin et al. |
| D464,962 S | 10/2002 | MacGregor et al. |
| 6,469,910 B2 | 10/2002 | Lefort |
| 6,483,445 B1 | 11/2002 | England |
| 6,489,910 B1 | 12/2002 | Lefort |
| 6,502,090 B1 | 12/2002 | Raisanen |
| D468,714 S | 1/2003 | Maruska et al. |
| 6,512,507 B1 | 1/2003 | Furihata et al. |
| D470,842 S | 2/2003 | Bhatia et al. |
| 6,516,202 B1 | 2/2003 | Hawkins et al. |
| D471,559 S | 3/2003 | De Saulles |
| 6,535,749 B1 | 3/2003 | Iwata et al. |
| 6,549,194 B1 | 4/2003 | McIntyre et al. |
| 6,557,004 B1 | 4/2003 | Ben-Shachar et al. |
| 6,577,721 B1 | 6/2003 | Vainio et al. |
| 6,583,806 B2 | 6/2003 | Ludwig et al. |
| D477,597 S | 7/2003 | Laverick et al. |
| 6,636,203 B1 | 10/2003 | Wong et al. |
| 6,643,124 B1 | 11/2003 | Wilk |
| 6,661,404 B1 | 12/2003 | Sirola et al. |
| D488,478 S | 4/2004 | Laverick et al. |
| 6,724,403 B1 | 4/2004 | Santoro et al. |
| 6,781,575 B1 | 8/2004 | Hawkins et al. |
| 6,792,090 B1 | 9/2004 | Kobayashi |
| 6,819,304 B2 | 11/2004 | Branson |
| 6,947,158 B1 * | 9/2005 | Kitamura et al. ............ 358/1.15 |
| 6,961,593 B1 | 11/2005 | Lonka et al. |
| 6,973,217 B2 | 12/2005 | Bolick et al. |
| 6,976,217 B1 | 12/2005 | Vertaschitsch |
| 7,007,239 B1 | 2/2006 | Hawkins et al. |
| 7,058,168 B1 | 6/2006 | Knappe et al. |
| 7,069,056 B2 | 6/2006 | Iwata et al. |
| 7,155,419 B2 | 12/2006 | Blackman et al. |
| 7,231,208 B2 | 6/2007 | Robertson et al. |
| 7,254,782 B1 * | 8/2007 | Sherer .......................... 715/764 |
| 7,295,852 B1 | 11/2007 | Davis et al. |
| 7,359,493 B1 | 4/2008 | Wang et al. |
| 7,624,351 B2 | 11/2009 | Unger et al. |
| 2001/0034222 A1 | 10/2001 | Roustaei et al. |
| 2002/0042853 A1 | 4/2002 | Santoh et al. |
| 2002/0044136 A1 | 4/2002 | Griffin et al. |
| 2002/0082043 A1 | 6/2002 | Wilska et al. |
| 2002/0086702 A1 * | 7/2002 | Lai et al. ....................... 455/556 |
| 2002/0089546 A1 | 7/2002 | Kanevsky et al. |
| 2002/0090980 A1 * | 7/2002 | Wilcox et al. ................. 455/566 |
| 2002/0115478 A1 | 8/2002 | Fujisawa et al. |
| 2002/0133378 A1 | 9/2002 | Mault et al. |
| 2002/0154178 A1 * | 10/2002 | Barnett et al. ................ 345/853 |
| 2002/0154745 A1 | 10/2002 | Shtivelman |
| 2002/0169924 A1 | 11/2002 | Osborn |
| 2002/0191160 A1 | 12/2002 | Chuang |
| 2003/0008679 A1 | 1/2003 | Iwata et al. |
| 2003/0034987 A1 | 2/2003 | Webb et al. |
| 2003/0064751 A1 | 4/2003 | Charlier et al. |
| 2003/0112225 A1 | 6/2003 | Granberg |
| 2003/0122779 A1 * | 7/2003 | Martin et al. ................. 345/156 |
| 2003/0148795 A1 * | 8/2003 | Moriki .......................... 455/566 |
| 2003/0228863 A1 | 12/2003 | Vander Veen et al. |
| 2003/0228888 A1 | 12/2003 | Adamson |
| 2004/0008827 A1 | 1/2004 | Martin et al. |
| 2004/0023643 A1 | 2/2004 | Vander Veen et al. |
| 2004/0026136 A1 | 2/2004 | Hill et al. |
| 2004/0028192 A1 | 2/2004 | Pelletier |
| 2004/0028199 A1 | 2/2004 | Carlson |
| 2004/0039794 A1 | 2/2004 | Biby et al. |
| 2004/0061706 A1 | 4/2004 | Cronin et al. |
| 2004/0062367 A1 | 4/2004 | Fellenstein et al. |
| 2004/0093380 A1 * | 5/2004 | Sellen et al. .................. 709/204 |
| 2004/0155909 A1 | 8/2004 | Wagner |
| 2004/0203977 A1 | 10/2004 | Kennedy |
| 2004/0240163 A1 | 12/2004 | Adams et al. |
| 2004/0268263 A1 | 12/2004 | Van Dok et al. |
| 2005/0267975 A1 | 12/2005 | Qureshi et al. |
| 2006/0015819 A1 | 1/2006 | Hawkins et al. |
| 2006/0033706 A1 | 2/2006 | Hawkins et al. |

| | | | |
|---|---|---|---|
| 2006/0121938 A1 | 6/2006 | Haitani et al. | |
| 2006/0160566 A1 | 7/2006 | Plahte et al. | |
| 2006/0161858 A1 | 7/2006 | Hawkins et al. | |
| 2006/0168539 A1 | 7/2006 | Hawkins et al. | |
| 2007/0209019 A1 | 9/2007 | Kaval et al. | |

FOREIGN PATENT DOCUMENTS

| | | |
|---|---|---|
| EP | 0 704 788 A2 | 4/1996 |
| FR | 2760933 | 9/1998 |
| WO | WO99/08238 A1 | 2/1999 |
| WO | WO01/13605 A2 | 2/2001 |

OTHER PUBLICATIONS

Sue Plumley, Ten Minute Guide to Windows NT Workstation 4.0, Aug. 1996, Que, ch. 9.*

Microsoft, Microsoft Windows & MS-DOS 6 User's Guide, 1993, Microsoft Corp., p. 19, 26.*

Microsoft® Windows Version 5.1, copyright 2001 (hereinafter "Windows") (screenshots 1-8).*

Microsoft Windows Version 5.1, copyright 2001, screenshots 1-13.*

Cowart, T., Mastering Windows 95- The Windows 95 Bible, (1995), 110-117, 352-359.

"Excerpts from Handspring VisorPhone(TM) User's Guide, Copyright 2000 Handspring, Inc.".

"Excerpts from Ericsson Mobile Phone 1888 WORLD User's Guide, Copyright 1998 Ericsson Mobile Communications AB".

Ikeya, B. "Detailed Overview of the PC Card Standard, PCMCIA", http://www.pcmcia.org/pccarcJstandard.htm., (1998).

"Introduction to PCMCIA Technical Tutorial, Dec. 6, 2002. pp. 1-11.".

"Nokia Introduces Mobile Chat With Nokia 3310", http://www.mobiletechnews.com/info/2000/09/01/1_42022.htm, (Sep. 1, 2000).

"Nokia, Frequently Asked Questions", http://www.nokia.co.in/nokiaapac/india/faqs_list/0,18778,39_41,00.html.

Kanellos, M. "Qualcomm Merges Phone, Handheld", CNET News.com, Sep. 21, 1998, http://www.news.com/Qualcomm+merges+phone%2C+handheld/2100-1001_3-215791.html.

"PCT International Search Report'", PCT/US2000/22182, (Jan. 10, 2001),8 pages.

"PCT Notification of Transmittal of International Preliminary Examination Report", PCT/US2000/22182, (Oct. 26, 2001),6 pages.

"pdQ (TM) Basics Handbook", *Qualcomm Incorporated*., (1998, 1999),96 pages.

MacNeill, D. "Messaging Card and NewtonMail: We Pick Up and Deliver", *On The Go Magazine*, http://www.pencomputing.com/Newton/NewtonNotes2.html. 2 pages.

Powell, E. "Kyocera pdQ Smartphone—Brief Article—Product Announcement,", http://www.findarticles.com/plartjdes/mjmOFAUTis917/ai65650619/print., (2000).

MacNeill, D. "Wireless Newton Technology Goes to Work", *On The Go Magazine*, Oct. 13, 1993, 2 pages, http://www.pencomputing.com/Newton/NewtonNotes2.html.

"Qualcomm pdQ (TM) 1900 Digital PCTS SmartPhone", *Qualcomm Incorporated*, (1999),2 pages.

Schlender, B. R., "Hot New PCs That Read Your Writing" *Fortune*, Reprinted,(Feb. 11, 1991), 6 pages.

Shah, R. "The Qualcomm pdQ: Kill Two Birds with One Phone", CNN.com, http://archives.cnn.com/i999rrECHJptechJi2/o3/qualcomm.pdq,(Dec. 3, 1999).

Stock, R. "The World of Messaging An Introduction to Personal Communications", *EO, Inc.*, Mountain View,(1992, 1993),pp. ii-69.

"The Handheld Computing Industry—2000", *Stanford Technology Ventures Program* (*STVP*), (Jan. 13, 2001),pp. 1-38.

"T-Mobile Products; Handhelds", http://www.tmobile.com, (Sep. 28, 2002),2 pages.

"T-Mobile Products; Sidekick", http://www.tmobile.com, Sep. 28, 2002,3 pages.

"Toshiba Computer Systems Group", http://www.toshiba.com, (May 28, 2002),1 page.

"Toshiba Computer Systems Group: Pocket PC e570", http://www.pda.toshiba.com, (Jul. 7, 2001),2 pages.

"Excerpts from Motorola Timeport Tri-Band Mobile Telephone Manual, Copyright 1999 Motorola, Inc.".

"PCT International Search Report", Publication WO 01/13605 A3, (Feb. 22, 2001).

"Printout of various website pages from www.bestnetcall.com regarding pdaCall (patent pending), printed Aug. 31, 2001".

"Printout of various website pages from biz.yahoo.com article "Conference Calling Added to BestNet's Service Designed for Palm OS(R) Handhelds" —Tuesday, Aug. 21, 2001".

""An Introduction to Mobile Messaging," Mobile Messaging, May 2003, [online] [Retrieved on Dec. 10, 2004] Retrieved from the Internet: URL: http://www.lebodic.netlintro.htm".

"3GPP2 Multimedia Messaging System—MMS Specification Overview—Revision: A. Mobile Messaging, May 2003, [online] [Retrieved on Dec. 10, 2004] Retrieved from the internet: URL: http://www.lebodic.net/left.htm".

Agrawal, P. et al., "Get Wireless: A Mobile Technology Spectrum", *IT PRO, IEEE*, (Jul./Aug. 1999),18-23.

"American Programmer, American Programmer, Inc., NY", (Dec. 1991),4-33.

"At Last, Technology Harnesse [sic] One of the Most Powerf [sic] Forces known to Men.", *GO Corporation*, 14 pages, Foster City,(1991).

"AT&T New Release, NCR Cuts Price of 3170 Notebook Computer 11 to 19 Percent", 2 pages, [*online*], retrieved from the Internet: URL: http://www.att.com/press/0393/930308.nca.html., (Mar. 8, 1993).

Caar, R.M. "The Point of the Pen", *Byte*, Reprinted, Feb. 1991, 10 pages.

Chan, E. et al., "Personal Digital Assistants & Wireless Convergence", *MGMT 557 Strategic Management of Innovation*, (May 4, 2000),1-28.

"Communications Solutions (TM) TMC Labs Test Drive, Mar. 2000", Retrieved from the Internet: URL: https://www.tmcnet.com/articles/comsol/0300/0300labs1.htm.

"Definition of Handheld Computer, printed from the website: http://dictionary.reference.com, dated Feb. 11, 2004 (3 pgs).".

"Definition of Handheld, printed from the website: http://searchmobilecomputing.techtarget.com, dated Feb. 11, 2004 (3 pgs).".

Cullen, A. "Connecting with Your EO Cellular Module", *EO, Inc. Mountain View.*, (1992, 1993),ii-33.

Cullen, A. "Getting started with Your EO Personal Communicatior", *EO, Inc. Mountain View*, (1992, 1993),ii-74.

Cullen, A. "Lookup Guide to the EO Personal Communicator", *EO, Inc., Mountain View.*, (1992, 1993),ii-320.

"GO Corporation Information Statement, 218 pages", (Nov. 8, 1993).

"Handheld Game Console—Wikipedia, the free encyclopedia, [online] [Retrieved on Oct. 13, 2006], Retrieved from the Internet: URL: http://en.wikipedia.org/wjkwHandheld_game_console.".

"Hewlett Packard, Products and Services, http://www.hp.com/, Nov. 11, 2001.".

"IBM Selects Racotek Data/Voice Communications Services to Interface with Touchmobile Product, PR Newswire, Jan. 26, 1993, 2 pages.".

"IBM TouchMobile Solution for Data Capture and Communication, Keeping Your Business Moving in the 90s, International Business Machines Incorporated, Jan. 1993, 13 pages.".

"IBM TouchMobile Information and Planning Guide, International Business Machines Incorporated, Mar. 1993, 20 pages.".

"IBM'S Touchmobile Helps Field Workers Collect Data at the Touch of a Finger, PR Newswire, Jan. 26, 1993, 1 page.".

Maki, K. "The AT&T EO Travel Guide", *John Wiley & Sons, Inc.*, N.Y, 1993, iii-555.

Sato, Larry "Non-Contact Sensor For Servo Track Writer", *Company Business and Marketing*, (Apr. 2000),2.

Hinckley, Ken et al., "Sensing Techniques for Mobile Interaction", *CHI Letters*, vol. 2,2, (2000),91-100.

* cited by examiner 621    622    623

624    625    626

DATA BROWSING METHOD AND SYSTEM FOR USER INTERFACE

RELATED U.S. APPLICATIONS

This application incorporates herein by reference, and claims priority to, the commonly-owned provisional patent application U.S. Ser. No. 60/467,794, entitled "MULTI-MODE CONFERENCE CALL SETUP AND MANAGEMENT AND DATA BROWSING USER INTERFACE TECHNIQUE ('MULLET DATEBOOK') AND DYNAMIC SIZING USER INTERFACE TECHNIQUE FOR DATA DISPLAY AND TEXT-KEY CUSTOMIZATION FOR AUDIO MENU SELECTION," filed May 1, 2003, and to the commonly-owned U.S. Pat. No. 6,516,202 B1, entitled "MOBILE COMPUTER SYSTEM DESIGNED FOR WIRELESS COMMUNICATION EXPANSION," issued on Feb. 4, 2003, and assigned to the assignee of the present invention.

FIELD OF THE INVENTION

The present invention relates to the field of user interaction with calendar data in handheld portable electronic devices.

BACKGROUND OF THE INVENTION

As the components required to build a computer system have reduced in size, new categories of computer systems have emerged. A relatively recent category of computer system is the portable or handheld computer device. A handheld computer system is a computer that is small enough to be held in the hand. As a result, these devices are readily carried about in a briefcase or purse, and some handheld devices are compact enough to fit into a person's pocket. By virtue of their size, handheld computer systems are also lightweight and so are exceptionally portable and convenient.

Further development of handheld devices has enabled their use for more and more tasks. For example, portable, and even wireless, access to computer networks is now readily available with suitably configured devices. The portability and convenience of handheld devices has enabled the even more exciting possibilities encompassed by the combination of the capabilities of handheld devices with the communication convenience of wireless telephones, e.g. cellular phones.

As more and more of these devices are carried in everyday activities, the demand for more and more capability from these versatile machines also grows. The demanding environment of modern working life sometimes requires multi-tasking by the individual, requiring a careful scheduling of daily events as well as the events of the busy workplace, often using the assistance of planning or scheduling aids or planners. Often these weekly and monthly planners need to be accessed while the user is on the go.

As convenient as handheld computing devices are, users demand ease of use. Often a simple task such as scheduling a meeting or checking a meeting time requires two hands and a convenient lap or desk. It would be desirable to simplify the graphical user interface experience for a user and present helpful information in an intuitive manner.

SUMMARY OF THE INVENTION

Accordingly, embodiments of the present invention are directed to a method for manipulating and viewing weekly organized and monthly organized calendar data in a database. The method is implemented in a portable computing device, such as a handheld computing device, and user input can be accepted by alpha-numeric input, touch-screen display tactile input or by five-way navigation button, for example.

More specifically, embodiments of the present invention relate to methods and devices for graphically managing and manipulating calendar data in a database which comprise presenting calendar data in a week view display of a graphical user interface. This mode includes graphically navigating in the week view display by moving from day to day and appointment to appointment and, when an appointment is selected, presenting a small preview window, e.g., pop-up, which lists the details of the selected appointment in the week view display. The preview window is displayed while, the week view is fully displayed and accessible by the user. Embodiments of the present invention are enabled to accept user input by responding to pressure applied to an element of a five-way navigation button in won implementation. Embodiments are also enabled to present portions of the week view display in an extended display area when an active input area (AIA) is collapsed in a handheld device implemented with a rectangular display.

Embodiments of the present invention are also presented which are enabled to present a month view display that can be graphically navigated either by five-way navigation button input or by stylus input to a touch screen display. Navigation in the month view comprises moving from day to day and from week to week. When a day is selected, a preview pop-up window can appear in the month view display while the monthly view is also displayed and accessible the preview window lists the scheduled appointments or events for that day. In embodiments of the present invention implemented with color displays, user-assigned categories of appointments can be shown as icons in the month view. Embodiments of the present invention implemented in devices enabled with a rectangular display are enabled to expand the month view when an active input area is collapsed.

Embodiments which are implemented in devices enabled with displays in a rectangular format can be called tall screen devices, some of which are implemented in handheld devices that slide open or unfold to present the extended screen area which allows the presentation of the active input area (AIA). In embodiments implemented in openable tall screen devices, the display acts as in a square screen implementation until the device is opened. However, with the AIA expanded, user interaction follows the square screen implementation except for the availability of the status bar and preview. When the display screen area is available on a tall screen device by collapsing the AIA, many of the preview functions available in other embodiments of the present invention migrate to the newly available area.

Embodiments of the present invention present five-way navigation usable in calendar viewing. Five-way navigation is especially useful in the month view. A view of the previous/last month is available on a tall screen device if the AIA is collapsed with no existing appointment highlighted. One capability of the month view is visibility of specific categories of appointments and categorized preview on a tall screen device. When an appointment is highlighted, the preview window shows as many appointments as possible and scrolling is possible within the preview window. Selecting a highlighted day causes embodiments of the present invention to present a full day view of the highlighted day.

BRIEF DESCRIPTION OF THE DRAWINGS

The operation and components of this invention are described by reference to the drawings.

DETAILED DESCRIPTION

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

In this discussion of some embodiments of the present invention, the terms, "handheld device," "portable electronic device" and "portable computing device" are used more or less interchangeably, as noted previously. In each case, they refer to a class of relatively small, user-portable, computing devices that are capable of performing the functions of portable computing devices and, importantly, accept user input in the form of pressure applied to, for instance, a touch-screen display/input device, through alpha-numeric key input, or through a multi-directional navigation button, etc. Some of the above terms are also used to refer to devices that combine the functions of portable computing devices with those of wireless telephones.

It is noted here that specific names are used herein for many of the features presented in embodiments of the present invention. The names are used in this discussion only for example and illustration. Embodiments can be implemented with different names and can present different languages without limiting the functions and features found in these embodiments.

Figure 1:
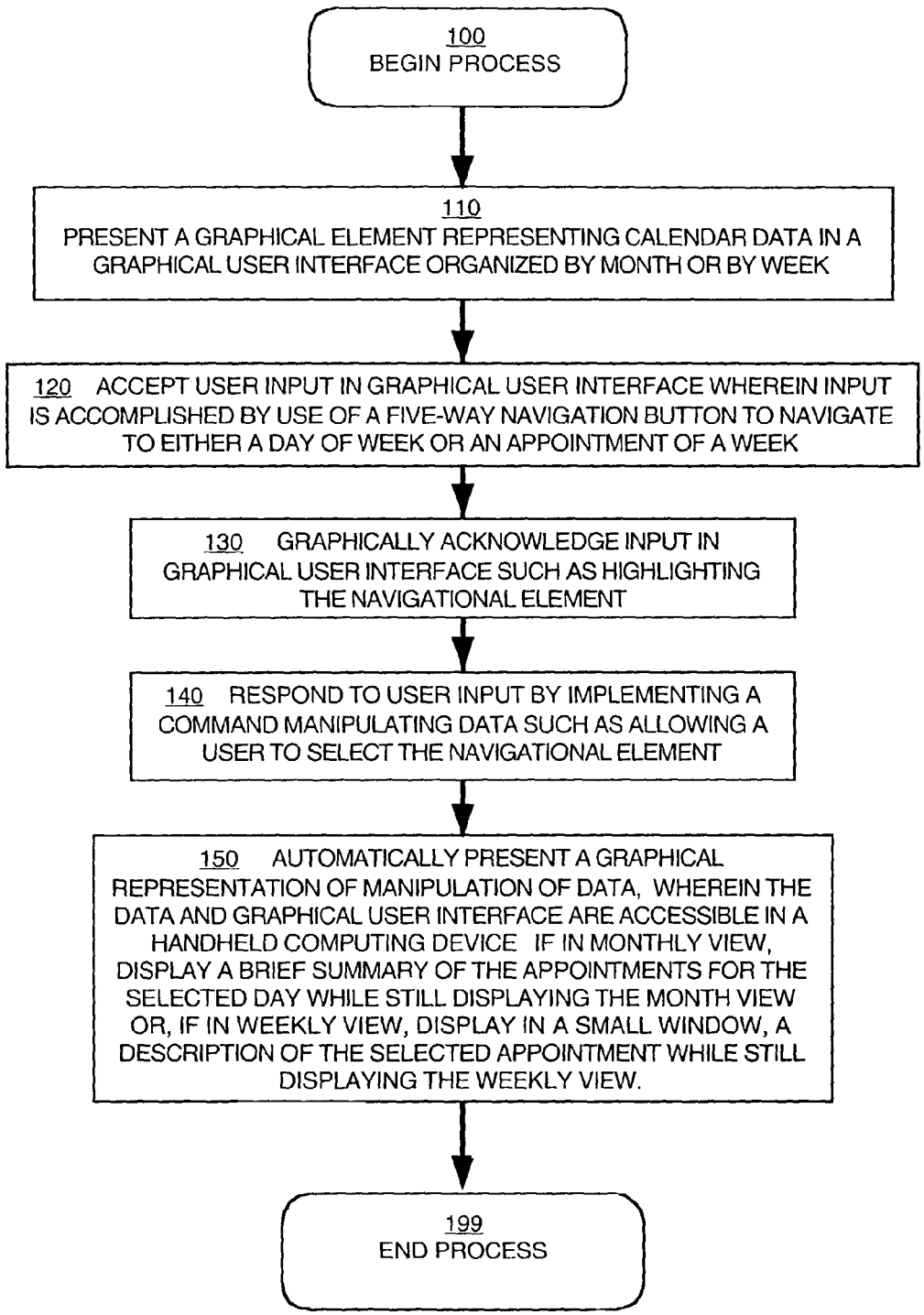
FIG. 1 illustrates, in block flow diagram, a method for browsing, manipulating and viewing data consistent with embodiments of the present invention.

FIG. 1 illustrates, in block flow form, a computer implemented method for graphically managing and manipulating calendar data in a database. There, process 100 begins by presenting an element of data in a graphical user interface, 110. This can be a monthly calendar graphical display or a weekly calendar graphical display and either can be displayed in response to a user activating a button. It is noted that a graphical user interface can be presented in many different types of devices and that embodiments of the present invention are enabled for operation in various types of devices. However, embodiments discussed herein can be implemented in a portable or otherwise handheld computing device.

Process 100 continues by accepting user input in the graphical user interface at step 120. It is noted that embodiments enabled to operate in handheld devices can accept input by several means, including but not limited to stylus tapping on a touch-screen display, keyed alpha-numeric input and by interaction with navigation buttons, e.g., a five way navigation tool. However, in one embodiment of the present invention, inputs may be taken from a user applying pressure to elements of a five-way navigation button. One five-way navigation button implementation features, as elements: up, down, left, right arrows, and select or pick button. According to step 120, the user may navigate to either a day of month or an appointment of a weekly view Process 100 continues by graphically acknowledging the user input through the five-way navigation button, 130. One response is to move or highlight a graphical cursor in the direction of the element depressed. For example, "up" results in a cursor movement toward the top of the display, "down" results in a cursor movement toward the bottom of the display, "left" results in a cursor movement toward the left side of the display, and "right" results in a cursor movement toward the right side of the display. Depressing "Pick" or "select" can result in a selection of a highlighted graphic feature. It is noted that the above names may not be present in all implementations. In some embodiments, symbols such as arrows can suffice to indicate the directions associated with the individual five-way button element.

It is also noted that responses to user input can be other than a cursor movement. In some cases, a highlighting can move from one graphical element to another. In others, a response can comprise a change of color or other property of a graphic element. Depressing elements of the five-way button result in graphic actions that are graphically intuitive to the user.

Process 100 continues further by responding to the user input, 140, by implementing a command which manipulates data Manipulations can comprise graphically associating data in the graphical user interface and to the input received. In the graphical user interface, this means that a selection button will select the element of the highlighted other graphical element and data associated with those selected graphical elements is manipulated in some fashion. When appropriate to the data presented and to the user input received, graphical elements in the graphical user interface change to reflect internal data manipulation.

AT step 150, if the user is in monthly view, then a small window will open to display appointments related to the selected day while the monthly graphical user interface remains displayed. Navigation through other days in the calendar will update the contents of this small window. Alternatively, at step 150, if in weekly view, then a small window will open to display the subject matter of the selected appointment while the weekly graphical user interface remains displayed. Navigation through other appointments will update the contents of the small window.

It is noted that, while embodiments of the present invention are implemented in devices with monochrome displays, there are features in other embodiments which are enhanced in their function by being implemented in color displays. In some embodiments, color highlights change color depending on the user input. In other embodiments, categories of data and their relationships are graphically presented in category-dependent colors.

Figure 2:
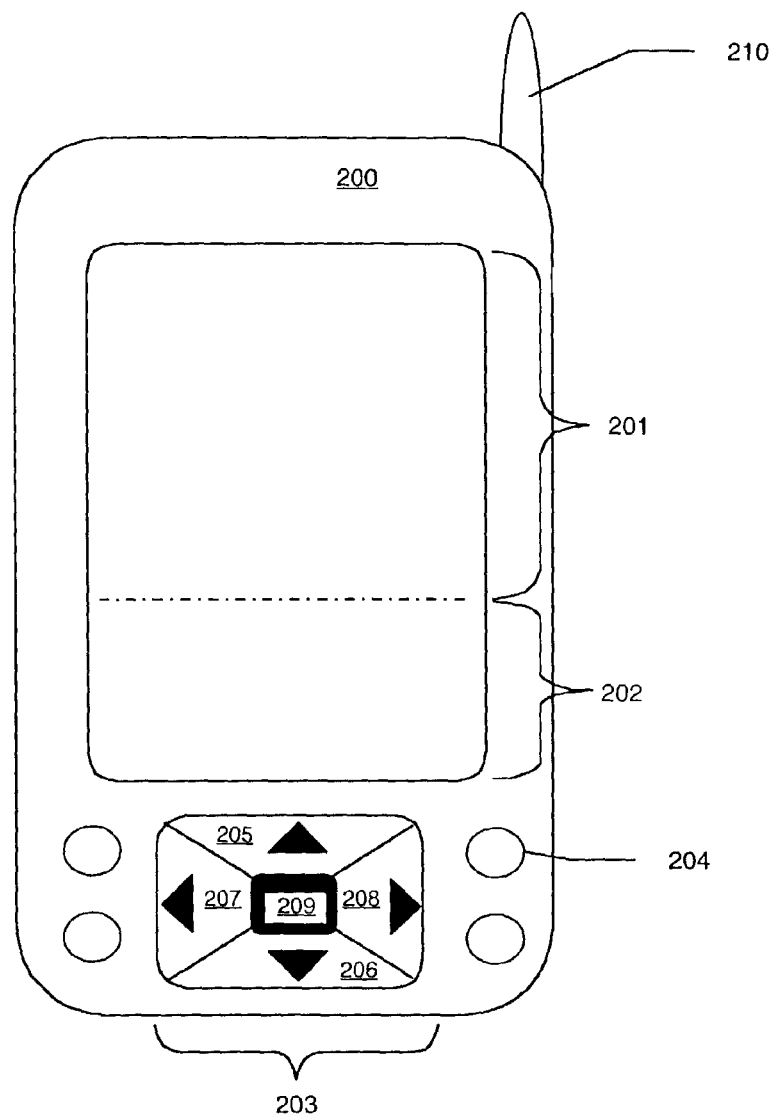
FIG. 2 illustrates an exemplary handheld computer device in accordance with embodiments of the present invention.

FIG. 2 illustrates a portable electronic device in accordance with an embodiment of the present invention. In this illustration, the portable electronic device is implemented as a handheld computing device, 200. Device 200 is enabled with a touch-screen display 201 and an active input area (AIA) 202.

Device 200 is also implemented with application buttons 204 and five-way navigation button 203. The five-way navigation button shown at 203 comprises "up" button 205, "down" button 206, "left" button 207, "right" button 208 and "pick" button 209. "Pick" button 209 can also be known as a "select" button.

It is noted that the presence, use, and position of application buttons 204 may vary in different implementations without limiting effect on embodiments of the present invention. Device 200 is also equipped with a stylus 210 which allows a user to easily input to the device via the pressure sensitive membrane or digitizer of the touch-screen display, 201.

Embodiments may employ variations of touch-screen display 201. The implementation illustrated is a "tall screen" device, meaning that it is enabled to present more information than a substantially square screen device in that it is enabled to use active input area (AIA) 202 as an extension of the normal, square, display area. It is noted that the presence, use, and position of application buttons 204 may vary in different implementations without limiting effect on embodiments of the present invention.

Figure 3A:
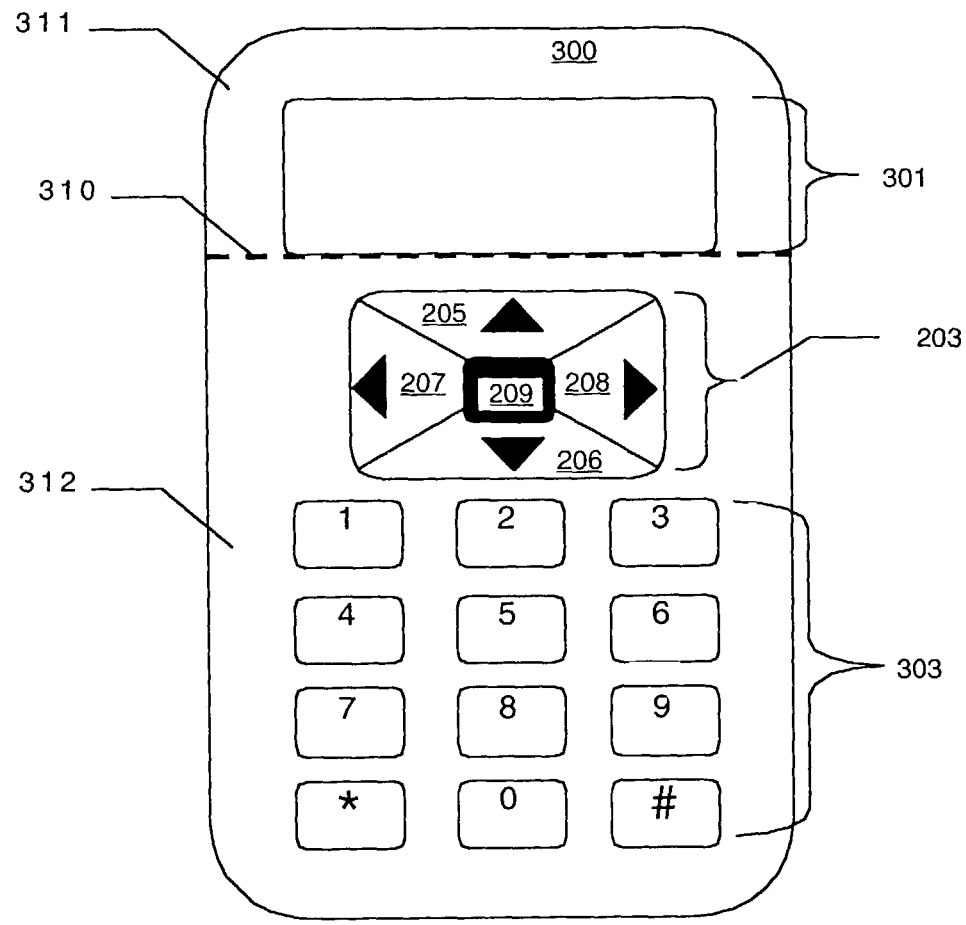
FIG. 3A illustrates an exemplary physical embodiment of a portable computer system in accordance with one embodiment of the present invention.

FIG. 3A illustrates another portable electronic device in accordance with an embodiment of the present invention. In this illustration, the portable electronic device is implemented as a handheld computer, 300 enabled with wireless phone capabilities. Device 300 is enabled with a touch screen display 301 and an active input area (AIA) 302.

It is noted that the particular device 300 illustrated is implemented in a folding or telescoping form factor. In this illustration, line 310 illustrates a dividing line between upper body portion 311 and lower body portion 312 which is shown slid over touch-screen display 301, thus showing only the uppermost portion of the display. The form factor shown is only an example of implementations available in embodiments of the present invention and is not meant to limit embodiments to any particular form factor.

Portable electronic device 300 is enabled with a numeric keypad 303 which comprises, in this implementation, numeric keys 0-9 as well as "star" and "pound" keys. The exemplary keypad shown is only for illustration and is not meant to limit alpha-numeric input devices any particular form in embodiments of the present invention.

Portable electronic device 300 is also enabled with a five-way navigation button, 203. The five-way navigation button comprises "up" button 205, "down" button 206, "left" button 207, "right" button 208 and "pick," or "select," button 209.

Figure 3B:
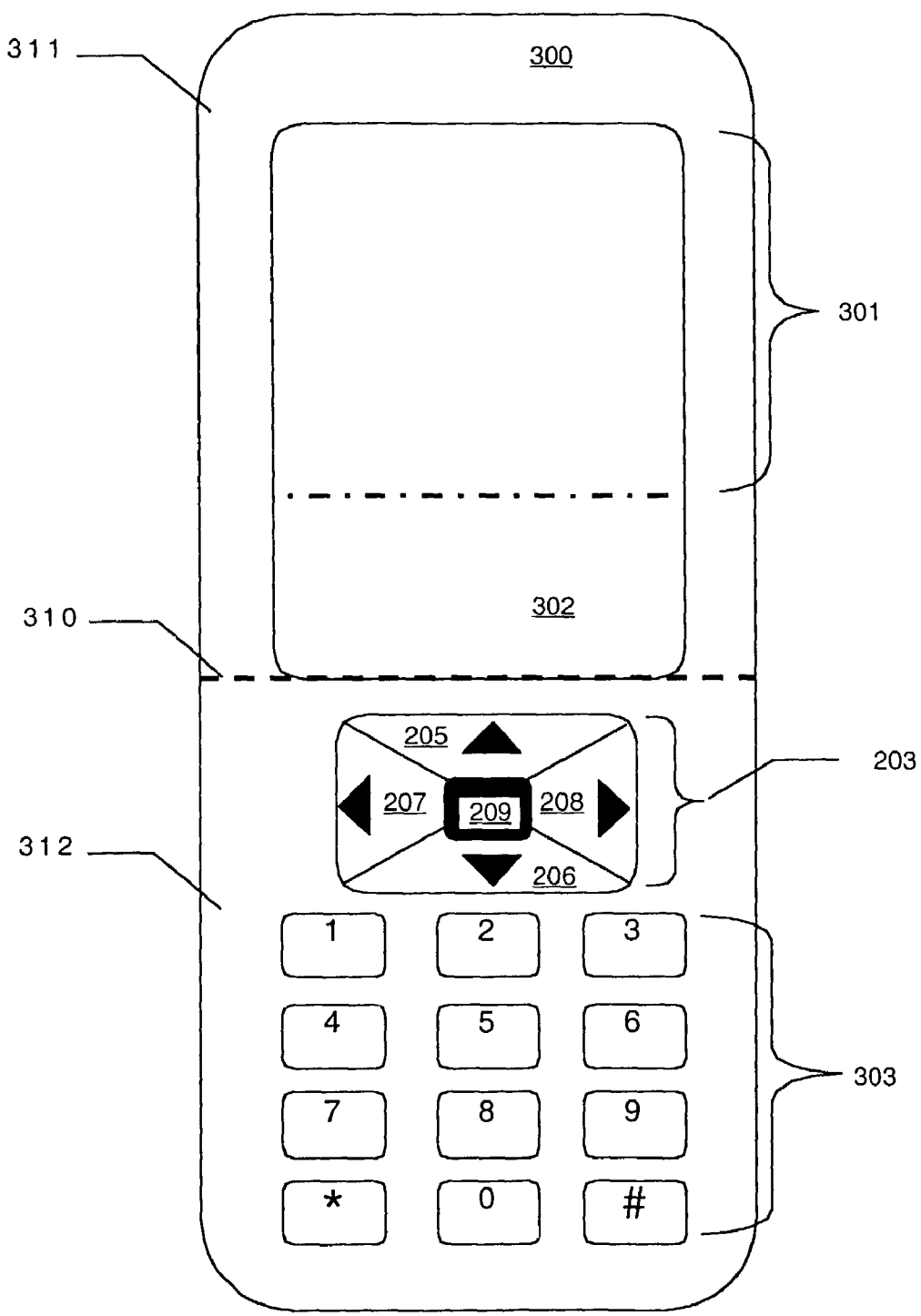
FIG. 3B illustrates an exemplary physical embodiment of a portable computer system in accordance with another embodiment of the present invention with an extended screen mode.

FIG. 3B illustrates portable electronic device 300 in an open position, with lower portion 312 retracted and exposing the full expanse of rectangular touch-screen display 301. In the display's exposed position, active input area 302 is shown.

Figure 3C:
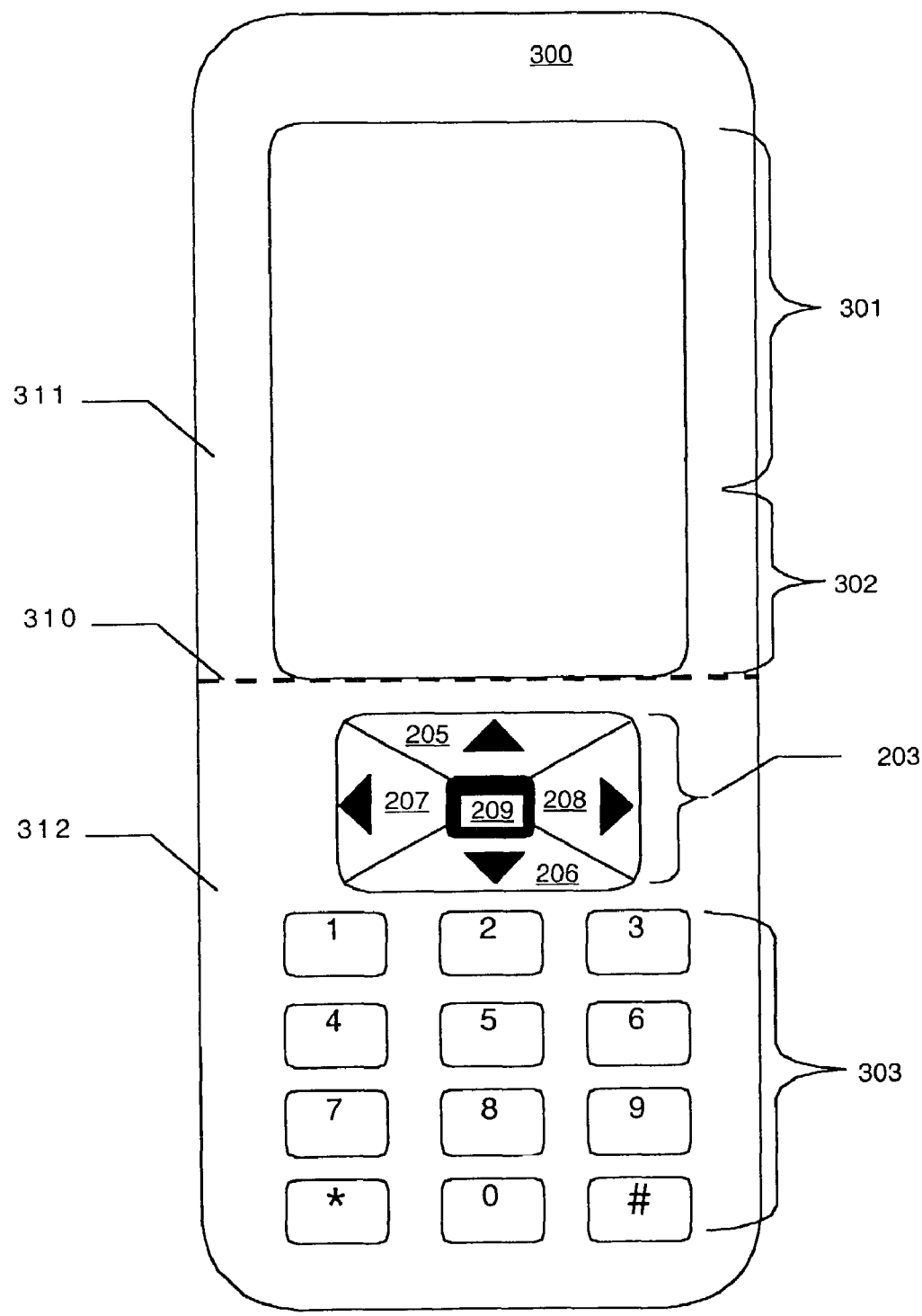
FIG. 3C illustrates a physical embodiment of a portable computer system in accordance with one embodiment of the present invention with an extended screen mode and a graphical user interface.

It is noted that embodiments of the present invention are enabled with an active input area, 302, that can be "collapsed." Collapsing the active input area allows the effective display area to expand, making use of the active input area when not needed for input FIG. 3C illustrates portable electronic device 300 with active input area 302 collapsed to allow a graphical user interface display, in this illustration showing a weekly calendar, to be shown in the full expanse of the display area.

It is also noted that some embodiments of the present invention may operate in devices with square screens. While a square screen may affect the displays shown, such embodiments operate in the same manner as those embodiments implemented with rectangular screens. Another name for the taller, rectangular, display can be "tall-screen." This term will be used interchangeably with "rectangular screen" in further discussions of embodiments of the present invention.

In embodiments of the present invention, five-way navigation button 203 is used to, among other tasks, move a cursor in the graphical user interface. The design of the five-way navigation button enables a user to move about the graphical user interface displayed and make selections of on-screen items using a single finger. One-hand operation, and thus one-hand access to a database resident in the portable electronic device, is thus enabled. An example of situations in which this is useful is in commuting where a user may be standing in a jolting subway car with only one hand available for using the portable electronic device. Five-way navigation button 203 enables complete access to all data and programs within device 300 with a single finger.

Figure 4A:
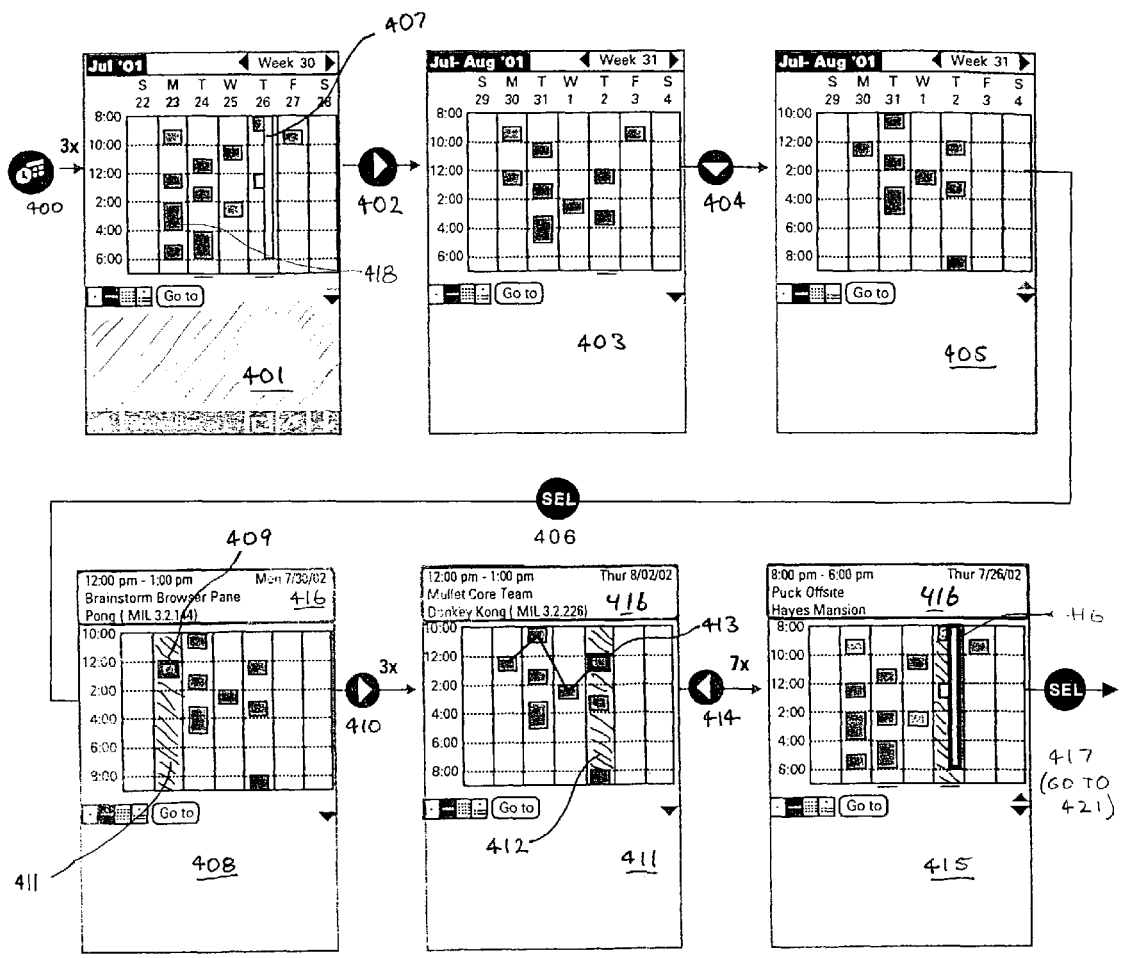
FIG. 4A illustrates a sequence of calendar data display in accordance with an embodiment of the present invention for weekly view.

An example of an operation enabled by embodiments of the present invention is illustrated in FIG. 4A. There, calendar data have been accessed in order to schedule an appointment and the user is in the weekly view. The embodiment illustrated, accessed either by stepping through a list of applications by five-way navigation button or by application buttons selection 400, supports a number of means of searching through calendar data. Among these are: graphically browsing the calendar from week to week in order to see what general availability of open time slots is, looking for important category information, and inserting a highlight. The embodiment illustrated, showing a weekly organized graphical display of calendar data in a tall screen device, can also use an expanded display area (a collapsed active input area) to browse existing appointments before selecting a particular day or appointment to schedule or to get more detailed information. It is noted here that the term "appointment" is used in the ensuing discussion of embodiments of the present invention to include any scheduled event, whether it is a meeting, a deadline, a memorable event or anything else that can be associated with a specific date and time in a calendar.

An embodiment of the present invention supports both square and tall screen devices. Screen illustration 401 shows a representation of a collapsible active input area and a status Bar in the graphical user interface as well. Embodiments implemented in tall screen devices are able to present a display as shown in 401. It is noted that the display shows a graphic image of a weekly calendar and can be called a week-view display.

Embodiments of the present invention implemented in square screen devices show a week-view calendar but not an active input area or on-screen status Bar. On tall screen devices with a sliding mechanism form factor, such as shown in FIG. 3A-3C, the ensuing example of a graphical user interface interaction can follow that of a square screen implementation until the device is slid to the open position.

However, though in the open position, with the active input area expanded, the interaction example follows the square screen implementation except for the availability of a status bar on some form factors. Once the display area is available on a tall screen device by collapsing the active input area, many of the preview functions available in other embodiments of the present invention migrate to the new area, but only if the active input area is collapsed in advance by the user.

The exemplary interaction illustrated in FIGS. 4A-4D can be called a "Five-Way Week View." Five-way interaction in week view, such as is shown at 401 and subsequent, and the view itself, is enhanced visually for an embodiment of the present invention. It is noted that, in week-view, more hours in each day are available for view on a tall screen device if the active input area is collapsed.

A feature of a five-way related week view, in this embodiment, is the availability of visibility of the day, month, title, time and location of specific appointments Within the week and the introduction of a preview, such as a time-out interval, when an appointment is highlighted. Selecting a highlighted appointment, such as by pressing selection element 209, returns a user to the no-highlight, week view display, 401, which is Jul. 22-28, 2001, in this example.

Navigation through a calendar in this embodiment is achieved by a user's pressing a right button element, 208, as shown at 402. In this example, the following week, Jul. 29-Aug. 4, 2001, becomes visible as at 403. Navigation up or down shows appointments that are initially out of view. Navigation down is exemplified by use of down button element 206 at 404, which in view 403 scrolls to show appointments after 6:00 PM, as shown in view 405. Pressing select button element 209 when the graphical user interface cursor is over a colored appointment block, 406, highlights the appointment block and produces the appointment details in area 409 of view 408. This is selecting the particular appointment to which the user navigated.

Navigation left or right in week view moves week-by-week as discussed above. Pressing select button element 209, in this embodiment, highlights the first appointment of the week or the next appointment of the current day if the currently highlighted appointment is in the currently viewed week, as exemplified at 409 in view 408. In the example shown in view 408, the current day and time is Monday the 30th of July, after 10:00 AM.

It is noted that there is also, in some embodiments, an ability to select a category of appointments to view. A category of appointment can, in those embodiments, be selected by pull-down menu as well as other means, and will be discussed further below. In view 408, highlighting or selecting appointment 409 results in the appearance of a small preview window 416. Preview window 416 lists not only date and time of the highlighted appointment but also user notes associated with it. The preview window is displayed while the graphical representation of the week view is still displayed and accessible.

It is also noted here that, in embodiments of the present invention implemented with a five-way navigation button, the well-known navigation by stylus pressure in the touch screen display is also available. The five-way navigation features do not limit stylus input. In using a stylus, highlighting is accomplished by tapping on an appointment block. As in five-way highlighting, this causes the preview window to appear as shown in browser pane 409.

At first selection, when the graphical user interface is in week view, in embodiments of the present invention employing five-way navigation, causes the insertion of a highlight on the first appointment block of the first day of the week, as shown at 409. As shown at 410, moving to the right with right button element 208 moves the highlight, with each successive step, to the first appointment block in each new day column. The summary information shown in window 416 of Display 411 is automatically updated. As shown at 412, the browser pane 416 changes to reflect the information associated with the newly highlighted appointment block. If a user presses and holds an navigation button element, highlighting accelerates through days and appointments, such as illustrated at 413.

Conflicting appointments can be navigated to on the week-view display using the same rule set. In the case illustrated, one more navigation left, as shown by seven button presses at 414, would go to the top conflicting appointment from 8-9:00 AM on Thursday, the $26^{th}$ of July, colored blue in this example, before going to the first appointment on Wednesday the $25^{th}$.

Figure 4B:
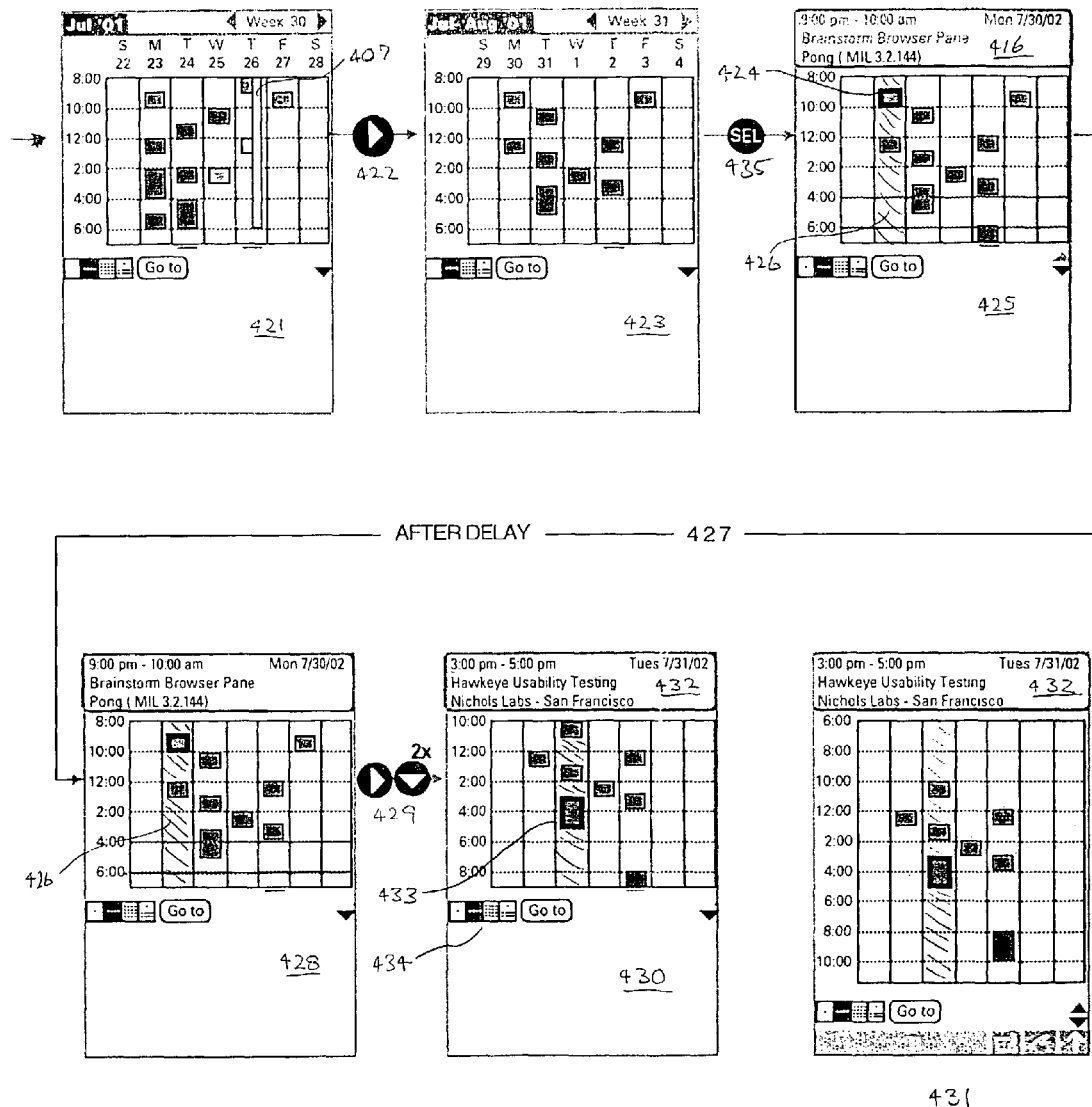
FIG. 4B illustrates a second sequence of calendar data display in accordance with an embodiment of the present invention for weekly view.

As shown by display 421 of FIG. 4B, pressing select button 209 removes the highlight and returns to browsing week by week with navigation left, 207, and navigation right, 208. On a tall screen device, preview will come up the same if the active input area is collapsed. Preview is always anchored to the top of the week view display.

When no highlight is applied, scrolling left or right (pressing left or right buttons) takes the display to the previous or next, respectively, week view. Pressing select, as at 435 of FIG. 4B, inserts a highlight on the first appointment of the first day of the new week-view display. In the example illustrated, if the appointment is in the current week, the highlight is inserted in the next appointment, as shown by 424. After highlight is inserted, the preview window, 416, appears, anchored to top again in response to selection 435. Week view scrolls as necessary to show appointments. Navigation left or right highlights the next or previous appointment and the associated details. Pressing select 209 again removes the highlight and preview 416.

Preview window 416 "times out" after a period if it is selected by stylus input in one embodiment. It does not time out if activated with five-way navigation in one embodiment. No preview appears in days with no appointments, such as weekends in the example of view 428. Any day with appointments causes preview window, 432, to re-appear with appointment details as shown in display 430.

As shown in view 430, navigation left or right follows the week-view convention of moving through weeks. Navigation up or down here scrolls appointments currently out of view into view.

It is noted that a command button bar 434 appears at the top of the active input area (AIA), at the bottom of the display area, if the active input area is expanded. The toolbar disappears when active input area is collapsed. The buttons of the toolbar enable day, week, or month view selection by stylus input. Selection of the buttons can also be made with the five-way navigation buttons, with the exception of "Go To" which is only available to stylus input.

Generally, after a highlight is inserted, a temporary preview window, 416 or 432, appears anchored to the top of the display. Navigation left or right highlights the next appointment and its associated details. The month view, week, view and day view displays appear as a grid and the five-way navigation through these views can also be referred to as "grid navigation." This is active while the preview window is displayed.

Select, when in the views and conditions illustrated in views 428, 430 and 431, removes the highlight and preview. Pressing and holding left or right moves the highlight rapidly. The view shown at 431 is only shown if the active input area has been collapsed in a tall screen View. Otherwise, the behavior is similar to that of a square screen device or a tall screen device with its slider cloed.

Figure 4C:
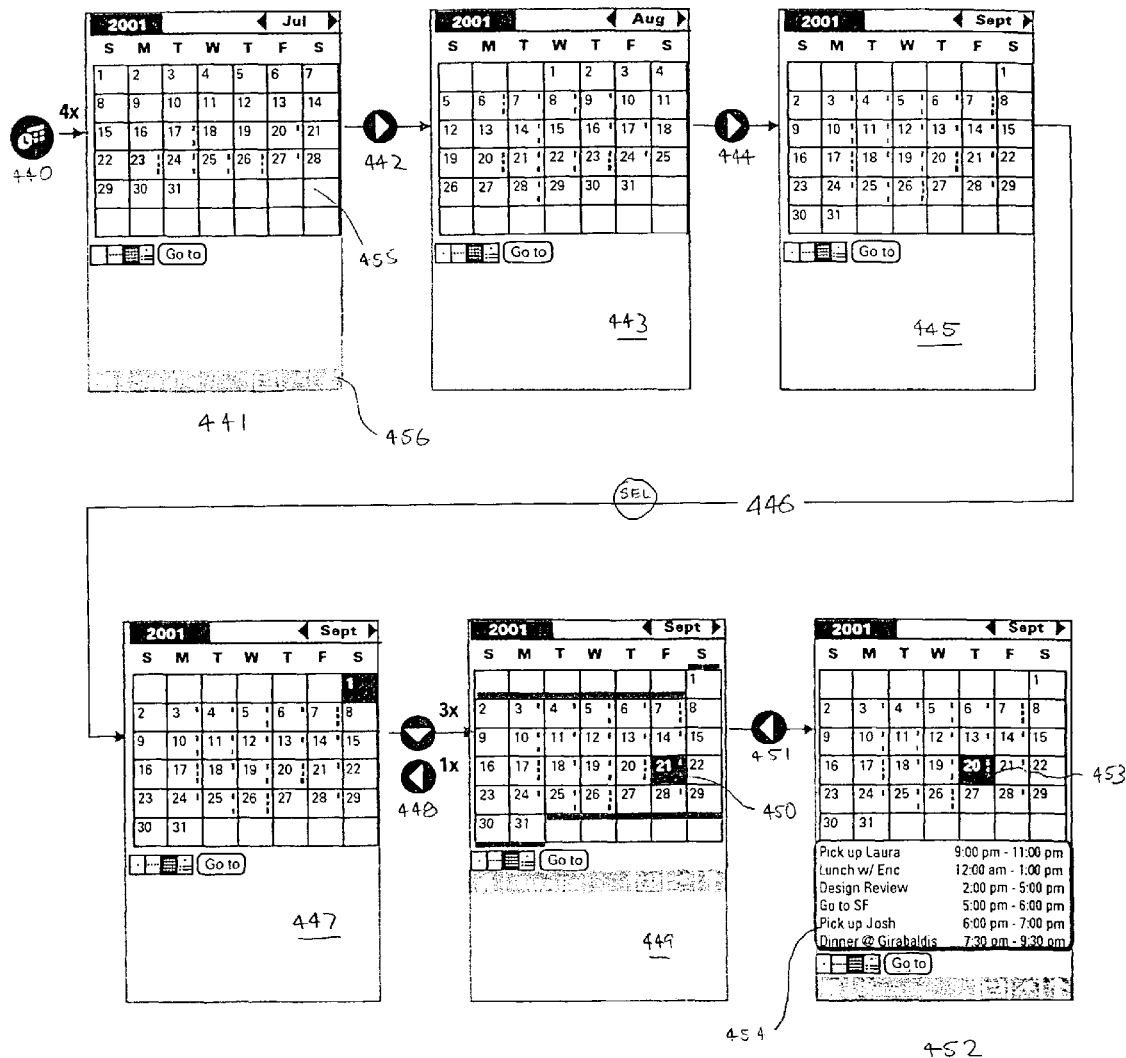
FIG. 4C illustrates a sequence of calendar data display in accordance with an embodiment of the present invention for monthly view.

FIG. 4C illustrates the behavior of embodiments of the present invention when browsing calendar data by months, known as month view. Month view, 455, which can be accessed in some embodiments by pressing an application button as at 440, can be used, in these embodiments, to accomplish a number of calendar-related tasks. Some tasks are: to browse month to month to see what day of the week a specific day falls on; to see weekend dates; to look for important event category information, using color data; and (on a tall screen device using open mode, meaning the display is fully opened and the active input area is collapsed) to browse existing appointments before selecting a particular day to schedule an event or to get detailed information of an existing scheduled event.

Embodiments of the present invention support both square and tall, screen devices. View 441 shows a representation of the display with a collapsible active input area (AIA) at and the Status Bar. This feature is available on tall screen devices in one embodiment.

Square screen devices generally do not have an active input area 455 or status bar 456. On tall screen devices with a sliding mechanism as is discussed above in FIGS. 3A, 3B and 3C, interaction with a user follows a square screen implementation until the device is slid to the open position. Even then, with the active input area expanded, the interaction follows the square screen implementation except for the availability of the status bar in some form factors. Once the display area is available on a tall screen device by collapsing the active input area, many of the preview functions available in embodiments of the present invention migrate to the new area, but only if the active input area is collapsed by the user.

The use of the five-way navigation button in a month view 455 is enhanced visually for some embodiments of the present invention, and specific enhancements are shown in the date book. A view of the previous or earlier months is available on a tall, screen device if the active input area is collapsed, with no highlight active.

In some embodiments, month view is enabled to provide visibility to specific categories of appointments, and also preview on a tall screen device with the active input area collapsed. When a appointment or event is highlighted, preview shows as many appointments or events as possible. Pressing select on a highlighted day goes to the day view for the highlighted day.

As shown at 442 and 444, navigating left or right displays the previous or next month, respectively, 443 and 445. Select here, 446, inserts a highlight at current day if in the current month or on the first day of a following month, as shown in view 447.

When a highlight is inserted, navigation left or right moves from day to day in the month view. As each day is highlighted, if the active input area is collapsed, the day preview 454 changes to the highlighted day. A small window opens to display a summary of the appointments for the highlighted day. Select again toggles off the highlight and navigation reverts to month to month stepping. If no appointment or event is scheduled in a day, no preview is shown. Navigation left/right/up/down moves the highlight within the month and holding left or right causes rapid scrolling. When the preview window is open, the monthly view interface remains displayed and can be used by the user to navigate to other days.

As noted earlier, many features in some embodiments of the present invention use color to enhance, the available information. Highlights for example are a different color in those embodiments than appointments or other features presented in a display. In embodiments implemented in monochrome devices, differentiation can be achieved by the use of patterns or shades of gray.

Preview, 454, shown only on a tall screen device with the active input area collapsed and a highlight inserted as in view 452, shows one line summary of each appointment or event scheduled in the highlighted day. Preview is displayed showing as many appointments or events as possible in the current day. If an appointment or event is scheduled, the preview is shown, even if only for one line. If no date is highlighted, the previous and/or next month view is shown as in FIG. 4D, view 464.

Figure 4D:
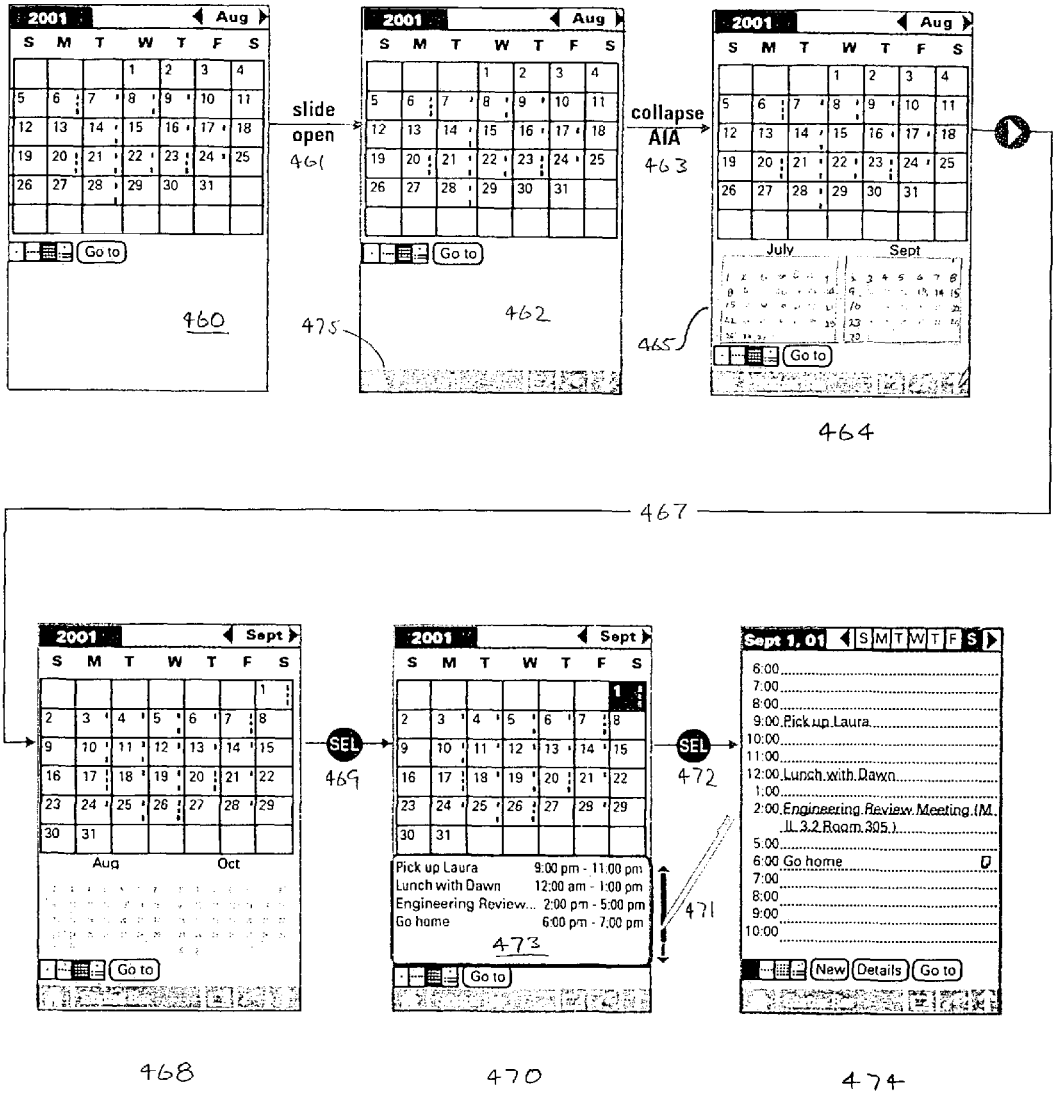
FIG. 4D illustrates a second sequence of calendar data display in accordance with an embodiment of the present invention for monthly view.

FIG. 4D, view 460, illustrates the month view shown when a slideable tall screen device is closed. When the device is slid open, 461, status bar 475 becomes active as shown in view 462. When the active input area is collapsed, as in view 464, previous and next month mini-calendars become visible, 465. When a user opens a slideable tall screen device on which the active input area has been left in a collapsed state and no highlight is active, the mini calendars 465 become visible as well.

When entering a new month, gas shown at 468 and the user then presses select, 469, then the first day of the month is selected and the preview window 473 for that day is displayed along with the graphical representation of the month in month view.

As many appointments or events as can be shown in the preview window are displayed. If no appointments or events are scheduled, a message such as "No Appointments Today" or some other message is displayed. In embodiments implemented with stylus input, a stylus scroll bar can be used to see the extent of appointments if there are more scheduled in a highlighted day than can be shown in the preview window, as shown at 471. When select 209 is pressed, 472, while a day is highlighted in month view and the preview window is currently open for that day, that day is shown in full day view, 474.

Figure 5A:
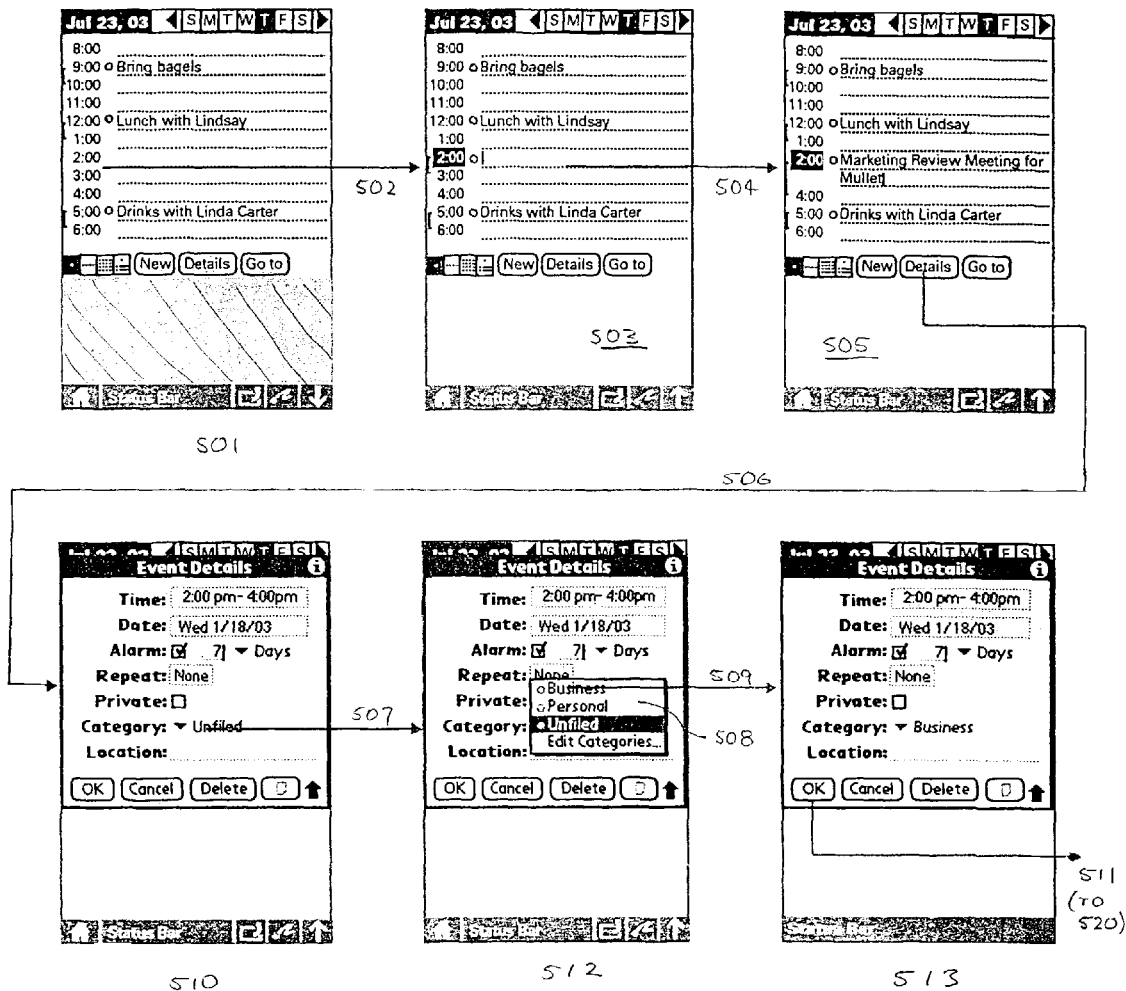
FIG. 5A illustrates category selection technique for the calendar data display in accordance with an embodiment of the present invention.

Embodiments of the present invention are enabled to categorize appointments or events that are scheduled. Categorization enables a user to prioritize different events and to view a set of events selected by category. Scheduled events of a given category can share a color characteristic so that events of a given priority are immediately visible in those embodiments implemented with color displays. FIG. 5A shows the categorization of several events and an exemplary interaction between the device and the user involving those events.

View 501 is a day view with three scheduled events in which the active input area is expanded. The user in this example wishes to set a new appointment for 2:00 PM on Jul. 23, 2003. At 502 the user selects 2:00 PM in the day view, 503, and at 504 inserts the appointment description or name, 505. By selecting the "details" button in the status bar 506, the event details window is shown, 510. The user then selects "category" from the event window, 507, and can select, in this embodiment, from four categories, 508. "Business" is selected, 509, and the selection is shown in the event details window at 513. If there are no other changes to be made from a list of default settings, selecting the "OK" from the status bar returns the display to the day view, as shown in FIG. 5B at 520.

Figure 5B:
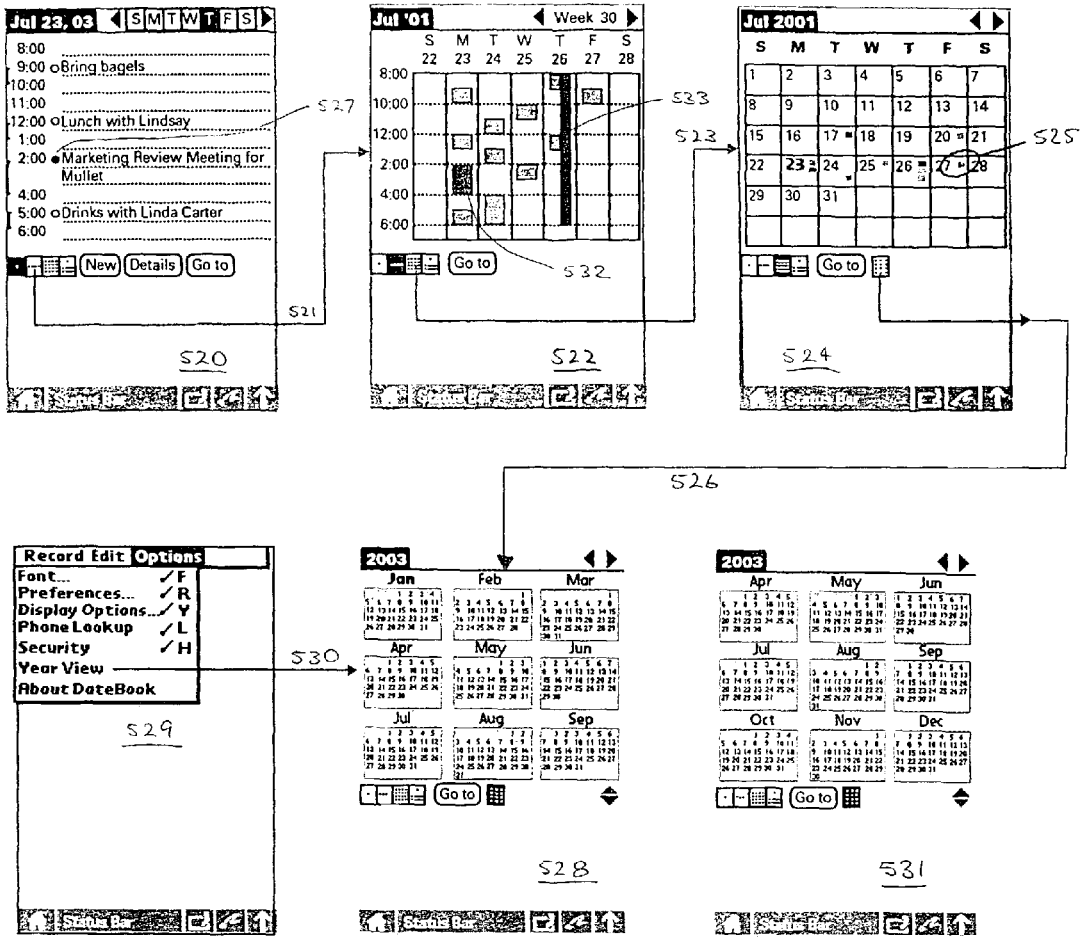
FIG. 5B illustrates category color embodiment of the calendar data display in accordance with an embodiment of the present invention.

View 520 in FIG. 5B shows a display of category color. In this embodiment, the associated color is in a "bullet," 527, adjacent to the meeting listing in day view. In other embodiments, other means can be used to display category color. In the day view, 520, the week view button can be selected, 521, resulting in the presentation of the week view, 522. It is noted, again, that the selection of buttons in the tool bar and the selection of views, dates, and scheduled events, can all be accessed by use of the five way navigation button.

The above selected category color appears, in this embodiment, in the highlighted event block in the week view. An event conflict, of which an example is shown in view 522 at 533, is shown with event blocks stacked side-by-side in the day column of the week view. The selected event remains highlighted during the display transition.

Selecting the month view tool bar button, 523, causes the category of event in a time block, the category color can be displayed. If there is more than one event in the block, the color bar in month view is divided into the appropriate colors, as at 525. In this embodiment of the present invention, however, conflicts are not displayed or flagged in the month view.

When viewing the month view as in 524, the year view tool bar button can be selected, 526, causing a current year calendar to be displayed, 528. It is noted that, with the active input area expanded; or in embodiments implemented in a square screen device, there is room for only nine months to be shown. Pressing up element 205 or down element 206, as appropriate, shows the remaining three months, 531. When the active input area is collapsed, a full twelve month display is available. The year view can also be viewed by selecting year view from the options pull-down menu, 529, which, in this embodiment, is available using five-way navigation.

Figure 6A:
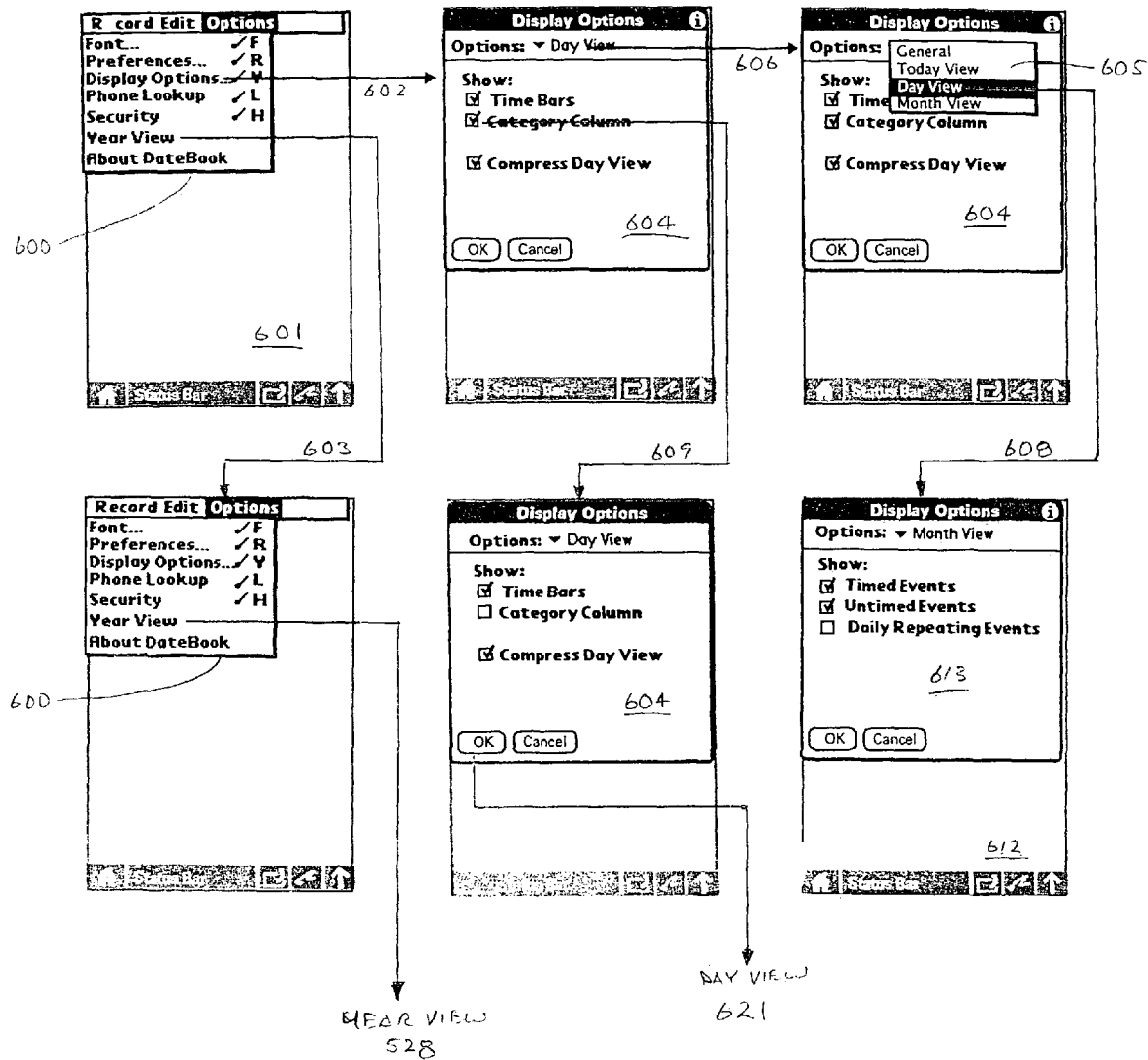
FIG. 6A illustrates techniques for category modification in the calendar data display in accordance with an embodiment of the present invention.

In FIG. 6A, the process by which categories of events can be changed or hidden is illustrated. In view 601, pull down menu 600 is activated and "display options" is selected, 602. It is noted that, in embodiments implemented with five-way navigation, stylus recognition command input is also enabled, as indicated in the right column of pull down menu 600. The "display options" selection can be made, with the stylus, by a "/"+"y" input. It is noted again that stylus recognition is the name of one of many systems by which strokes of a stylus on a touch-screen display are interpreted as input by a user.

The display options window, 604, can be presented in four views to accommodate new settings: general, today view, day view 604, and month view 613. In some embodiments, the display options dialog, 605, defaults to the display options window for the current view or to the general window if the current view has no specific options selected. Selecting the "OK" on-screen button causes the display of the associated display. The year view display, shown at 528 in FIG. 5B, can also be caused to display by selecting "year view" from the options pull down menu.

Figure 6B:
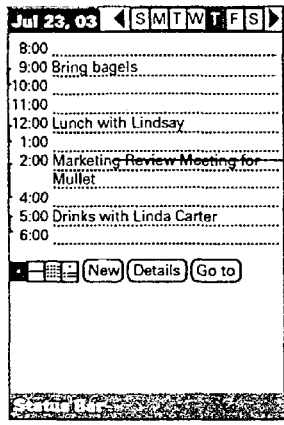
FIG. 6B illustrates techniques for options selections in the calendar data display in accordance with an embodiment of the present invention.
Figure 6B:
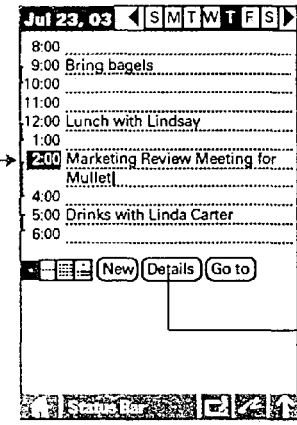
Figure 6B:
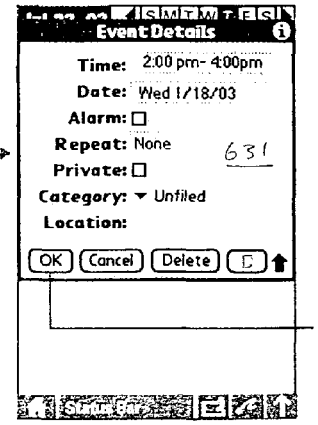
Figure 6B:
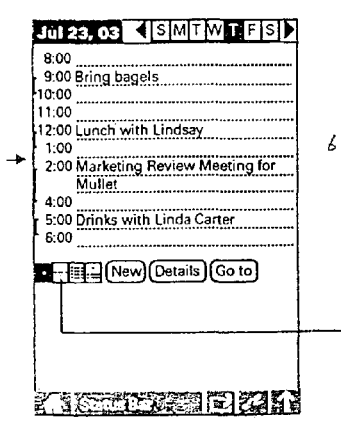
Figure 6B:
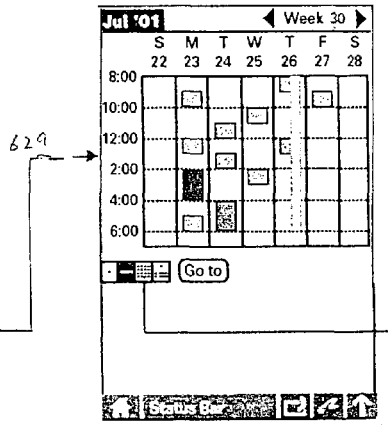
Figure 6B:
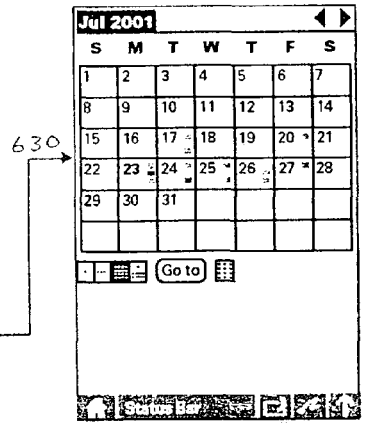

When the options selections have been made, the display options window can be closed and desired view is caused to display. In the example here, the day view is displayed, 621 in FIG. 6B. In this particular example, Thursday, Jul. 23, 2003 is the day under scrutiny. When the event in question is highlighted, 628, the event details window, 631, appears. In this window, the time and date of the event can be set or changed, an alarm can be set with its attendant options, the category of the event can be changed and a location can be entered into the detail notes. Each of these options can, be selected by stepping through with the five way navigation button or by stylus input. Selecting OK returns the display to the previous view. As discussed above, selecting a view tool bar button, 629 or 630, causes the display of the associated view, 625 or 626. It is noted that the category "bullet" in the day view, previously discussed at 527 in FIG. 5B, is not shown, in this embodiment, if the category option is not selected for the day view.

Figure 7A:
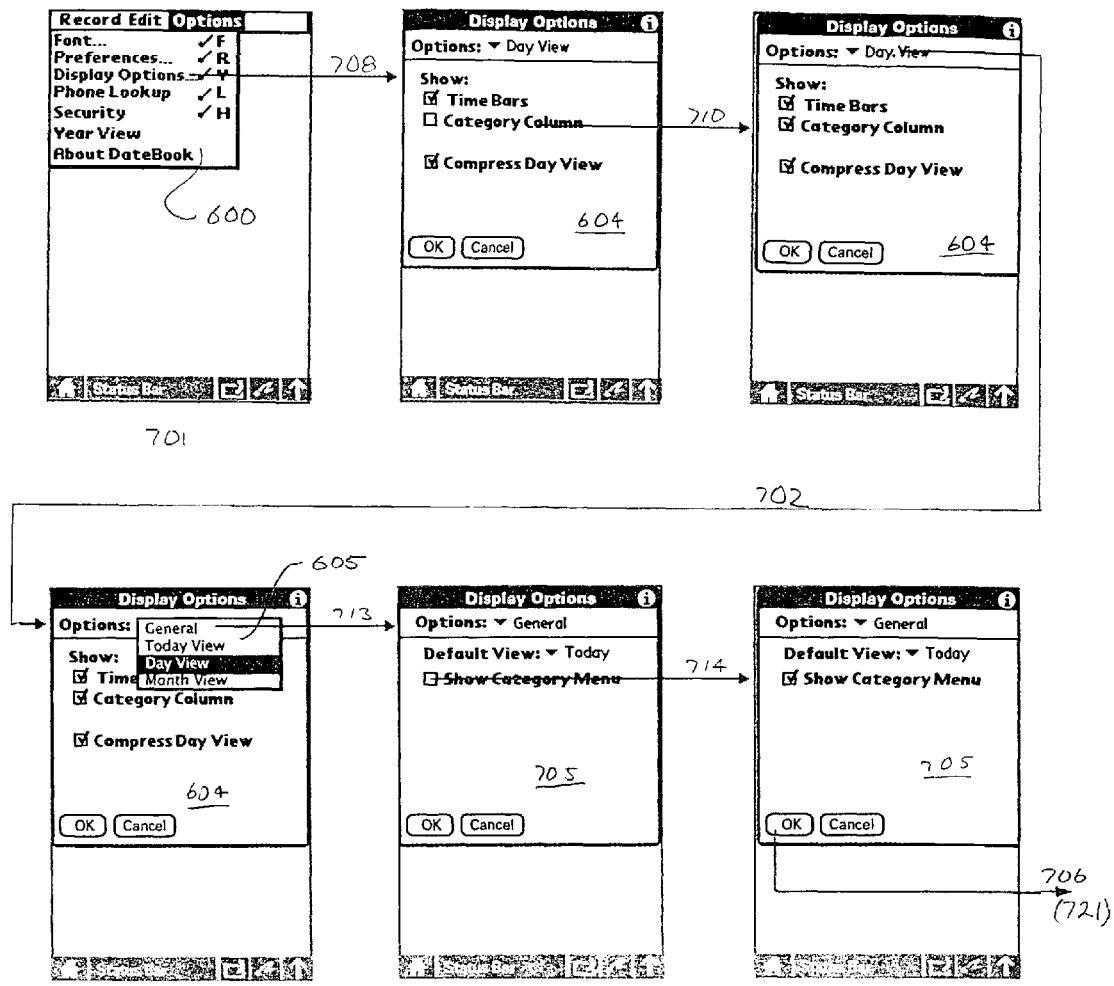
FIG. 7A illustrates techniques involving display options in the calendar data display in accordance with an embodiment of the present invention.

In embodiments of the present invention, category picking and category color can be displayed or hidden in all views as shown in FIG. 7A. There, "display options," 604 is selected, 708, from the options pull down menu, 600. The display options window is displayed and the "category column" option is selected, 710. Selecting view options 702 displays the view options dialog 605 and, in this example, "general" is selected, 713. From the resultant general display options window, 705, the "show category menu" option is selected at 714, then "OK" is selected, 706, causing the display of the day view at 721 in FIG. 7B.

Figure 7B:
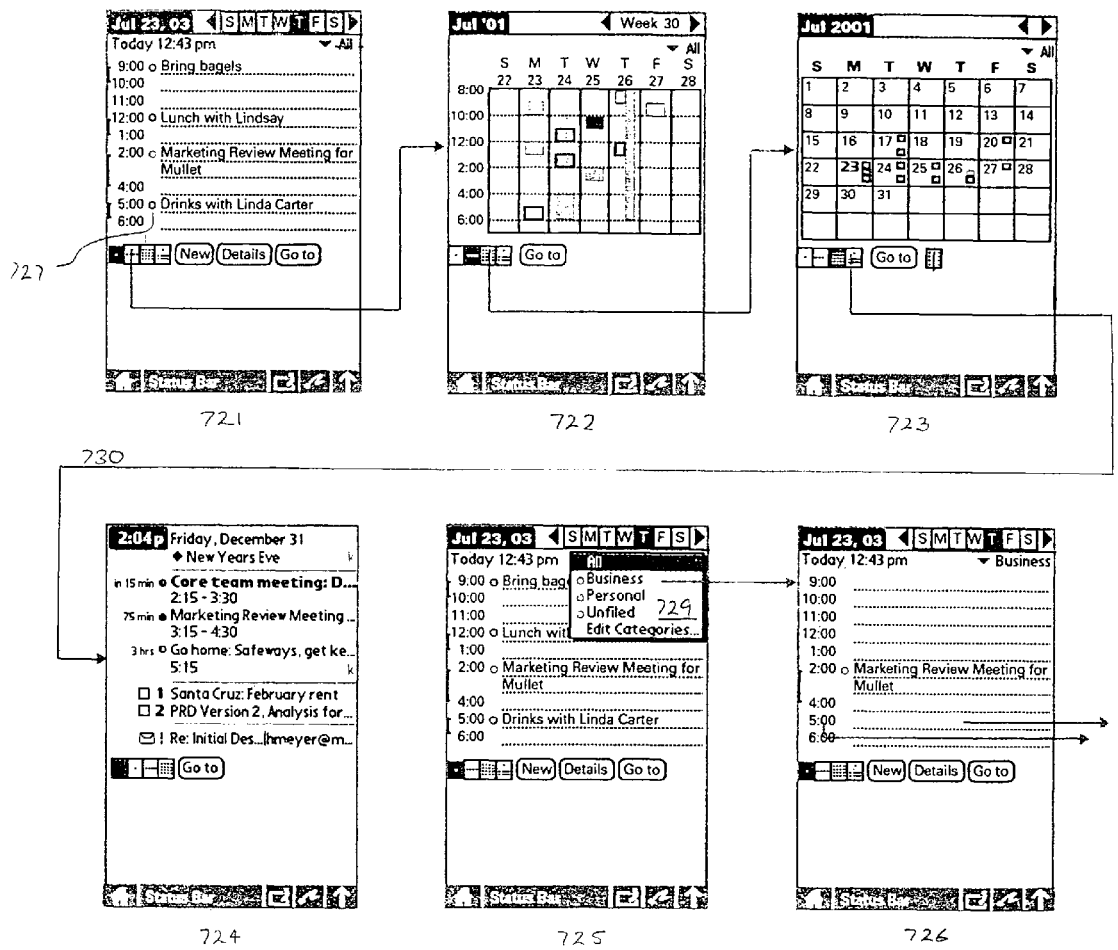
FIG. 7B illustrates techniques involving display options in the calendar data display in accordance with an embodiment of the present invention.

In view 721 of FIG. 7B, a category line is now visible at the top of the day view. Category column 727 is also visible in the day view. As shown in view 722 by selecting the week view, the category line is also visible at the top of the week view and also, as shown in view 723, at the top of the month view. In this embodiment, switching back-and-forth between a display that has a category filter selected and one that does not has no effect on either selection.

In embodiments of the present invention enabled with color displays, the user-selected category color is displayed in the category pull down dialog, 729. If there are categorized events scheduled in a view in which a different category is selected, those events are hidden in the view. This can enable a user to instantaneously determine whether a particular category event, such as a business meeting, for example, is scheduled in a given day. A hidden event, however, can lead to a schedule conflict.

Figure 7C:
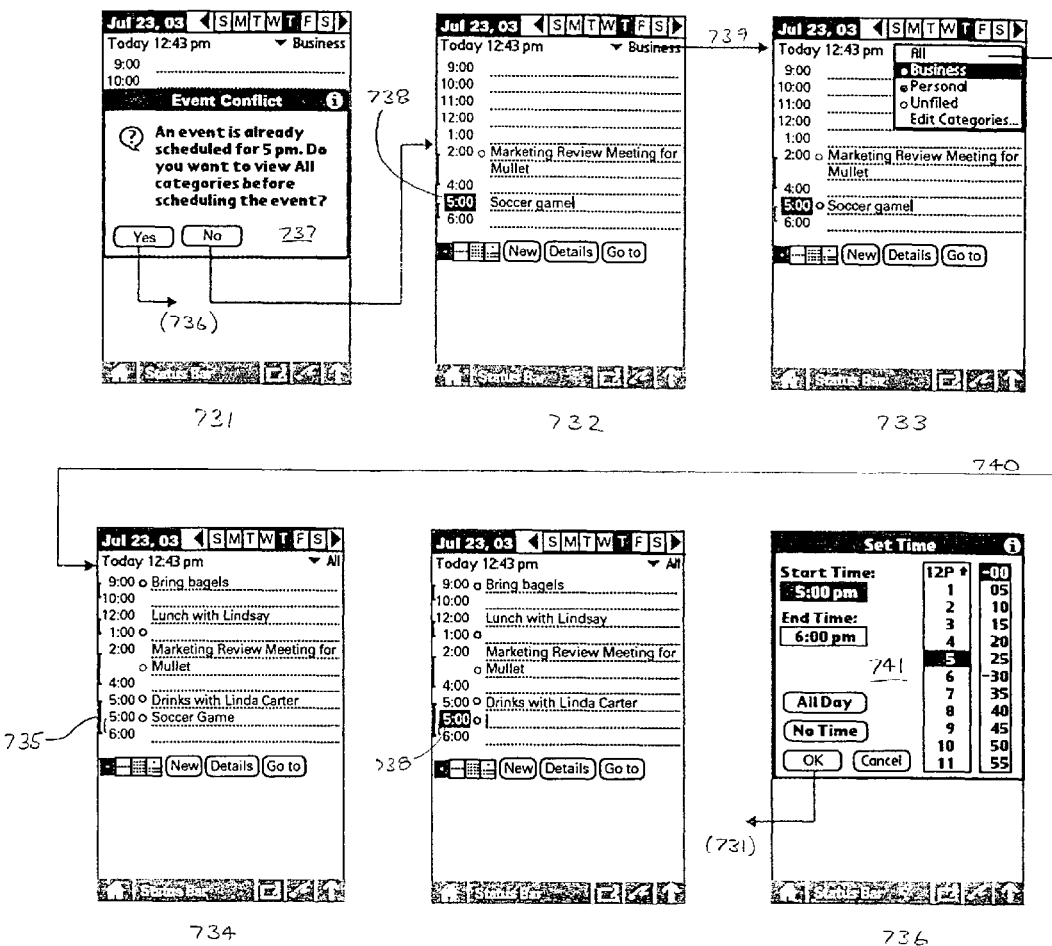
FIG. 7C illustrates resolving schedule conflicts in the calendar data display in accordance with an embodiment of the present invention.

Schedule conflicts are resolved, in embodiments, as shown in FIG. 7C. There, event conflict alert dialog 737 is shown as when a user attempts to schedule overlapping events. The alert dialog box reminds the user that not all category events are shown and offers the option of viewing the hidden categories before scheduling the conflicting event. If the user elects to not view all categories of events, the day view returns with the conflicted event signifying a conflict by highlighting the time in the time, bar, as at 738. The alarm highlight can be in an alarming color in color implementations. By selecting the category line, 739, the category dialog is made visible and "all" can be selected, 740, which causes all categories of events to be shown, 734, and the conflicting events' duration bars, 735, to be shown in an alarm color. If at 737 the user chooses to view all categories of scheduled events, the scheduling set time dialog box 741 appears and the event is scheduled.

Figure 7D:
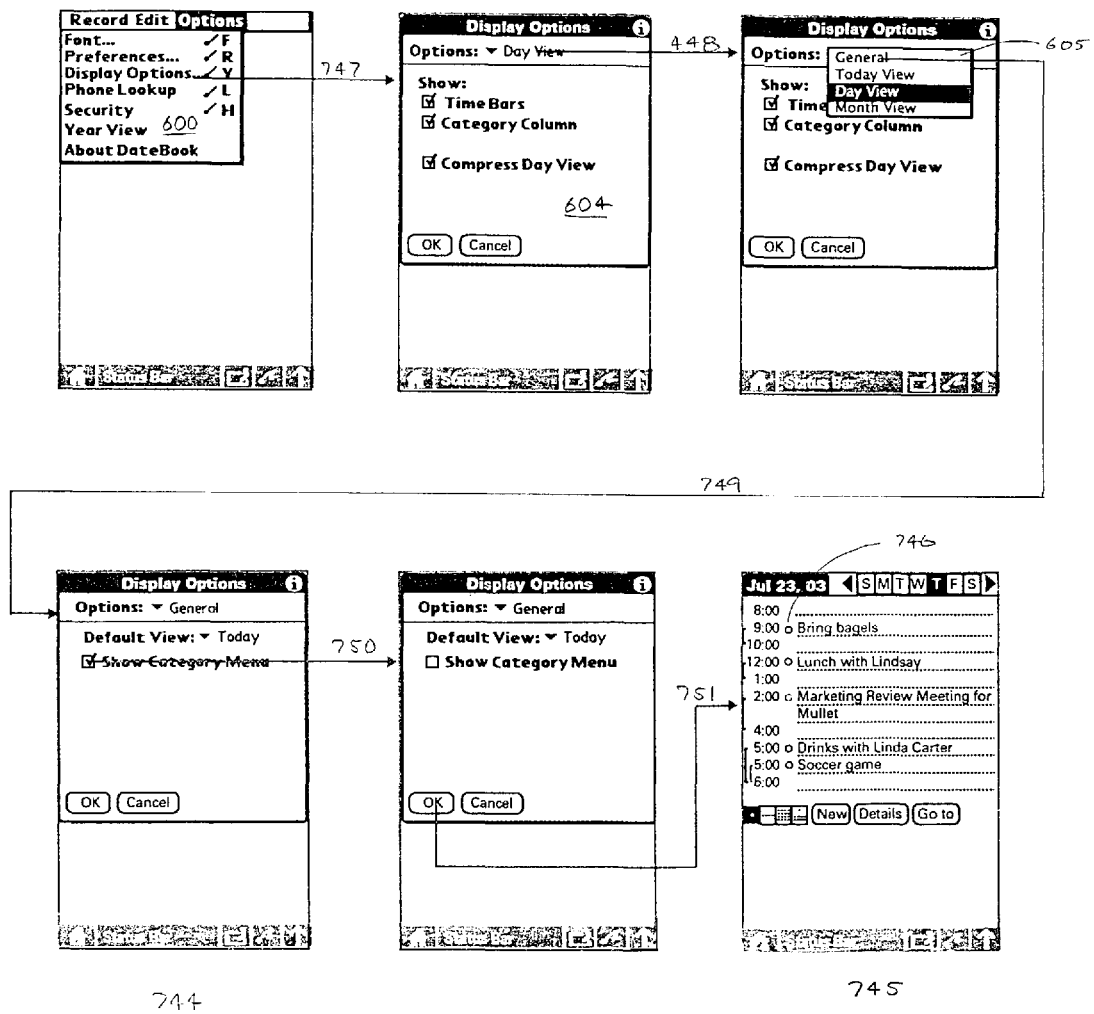
FIG. 7D illustrates that category links can be hidden in the calendar data display in accordance with an embodiment of the present invention.

In FIG. 7D, the category links can be hidden if a user so decides. Options pull-down menu 600 is viewed and display options is selected, 747. The display options dialog 604 is shown and the view options dialog 605 is available to select the appropriate options set, as at 749. From there, th "show category menu" option is deselected at 750, and the category pick line is no longer visible at the top of the view pages, as shown in view 745.

The features discussed above, and others, are available to users of embodiments of the present invention implemented in portable hand-held computing devices enabled with five-way navigation buttons. However, embodiments are also implementable in other devices in which five-way navigation is enabled.

Figure 8:
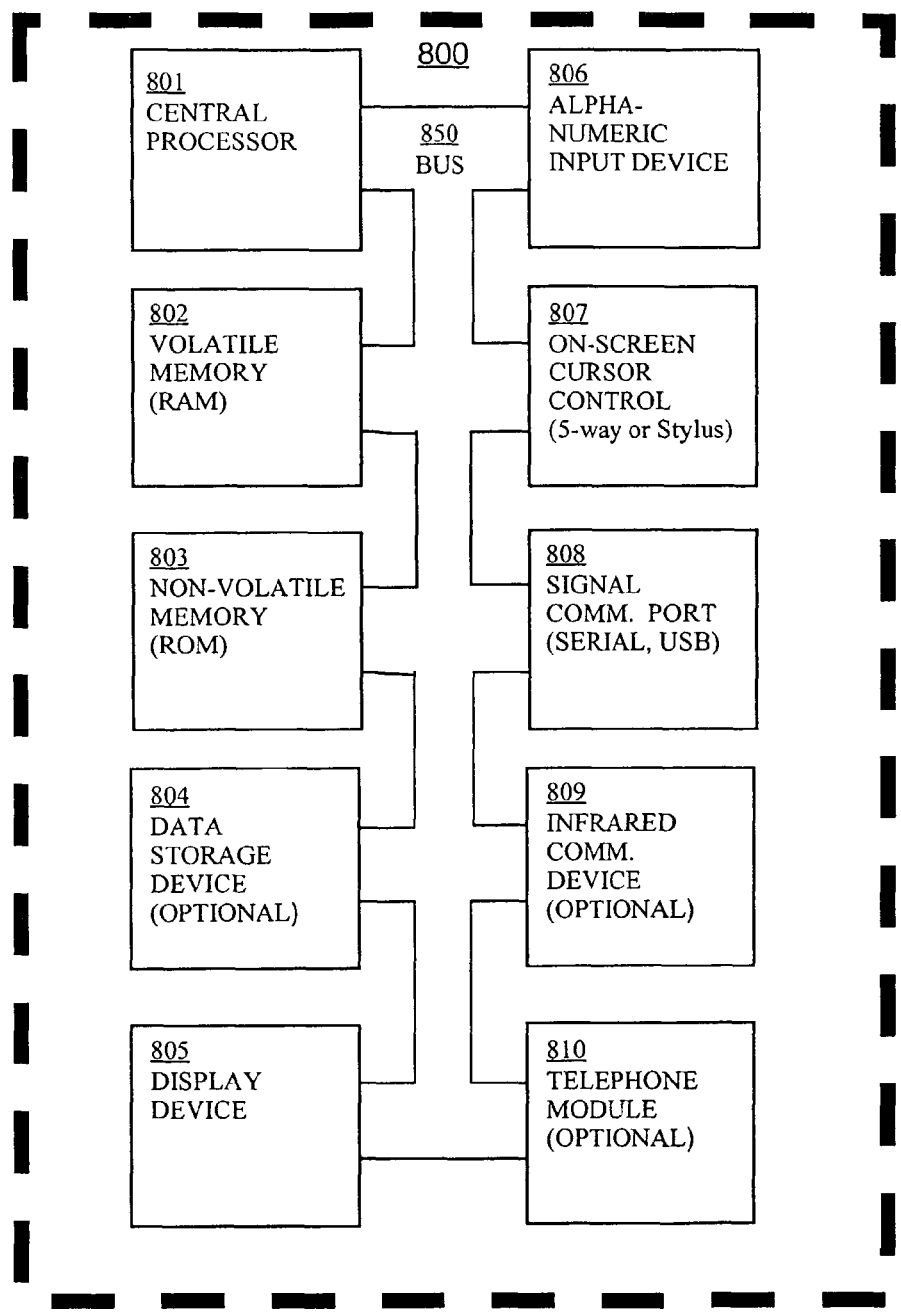
FIG. 8 illustrates an exemplary portable, wireless, computer system, optionally enabled as a telephone, in accordance with an embodiment of the present invention.

Embodiments of the present invention are expected to operate in a computer system, such as a handheld computing device. A configuration typical to a generic computer system is illustrated, in block diagram form, in FIG. 8, generic computer 800 is characterized by a processor 801, connected electronically by a bus 810 to a volatile memory 802, a non-volatile memory 803, possibly some form of data storage device, 804 and a display device 805.

While it is noted that display device 805 can, be implemented in different forms, embodiments of the present invention are implemented in devices equipped with touch-screen displays combining a liquid crystal display (LCD) screen and a pressure-sensitive input membrane overlaying the display. Other embodiments can be implemented with cathode ray tube (CRT) displays or other implementations.

Bus 850 also connects an alpha-numeric input device 806 and cursor control 807. Embodiments of the present invention are enabled to accept alpha-numeric input by reading handwritten characters in the touch-screen display. In discussions above of embodiments of the present invention, handwritten characters are written in the active input area (AIA). Other embodiments can accept alpha-numeric input from keystrokes in a keypad. Cursor control in embodiments of the present invention is by either tapping appropriate areas of the touch-screen display with a stylus or, preferably, by pressing appropriate elements of a five-way navigation button.

Communication I/O device 808 can be implemented as a serial port, USB, or infrared port. In various implementations, communication I/O device 808 may be realized as a modem, an Ethernet connection, a wireless device, or any other means of communicating signals between a computer system and a communications network. Some embodiments are enabled as wireless telephones. These phone-enabled devices also are equipped with telephone module 809.

An embodiment of the present invention can be called a datebook. It is envisioned that users of the datebook will use four usage modes. The first of these is a baseline usage mode. The datebook can be used without assigning categories to events or sharing categories. Although the category functionality provides additional organization and view features that are useful, many users may choose not to use categories in the datebook. In this case the datebook will, appear generally unchanged to existing users and they, will want to maximize the space available for events A second usage mode envisioned is one of minimal usage. Users can assign categories to events for the added visual appeal of color and the functional ability to easily scan displayed views for different types of events. Users can view all categories and not filter events which can easily lead to scheduling over "hidden" events. By not displaying the category picker in this scenario, more space is allowed for events.

A third usage mode envisioned is heavy category usage. Users that organize events into categories and generally have a full calendar may also wish to view individual categories on a temporary basis. They will generally want the category picker and color displayed at all times if they are filtering events frequently. This will allow them to quickly switch back to all events for scheduling and to provide context for what they are viewing.

A fourth usage mode is shared category usage. Users may share event categories with family, friends and link events to receive updates. These users will generally belong to mode 2 and mode 3 but could be any of the above. They will generally have to make use of the category features in order to effectively share categories. The users will need to be able to distinguish between their own events and other events with category color and filtering. The shared feature is intended as lightweight sharing between themselves and others with basic functionality to reduce duplicate events.

A novel method and system for browsing, viewing and manipulating calendar data in a weekly view mode and a monthly view mode have been disclosed. The method is enhanced with user input through a five-way navigation button implemented in a handheld computing device such as a handheld computing device.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of displaying calendar information comprising:
   displaying a weekly view graphical image on a display screen, wherein said weekly view graphical image comprises days of the week and appointment icons therein;
   associating the appointment icons to a category;
   displaying only the appointment icons for a selected category;
   wherein displaying only the appointment icons for a selected category further comprises:
   displaying the appointment icon in a color that associates the appointment icon to the category;
   visually highlighting appointment icons in response to user navigation input;
   in response to a user selection of a first highlighted appointment icon, automatically displaying a preview window comprising details of said first highlighted appointment icon on said display screen, wherein said preview window is displayed simultaneously with said weekly view graphical image, said weekly view graphical image remains user accessible while said preview window is open, said preview window is scrollable independent from said weekly view graphical image;
   in response to the user collapsing an active input area for said display screen to enlarge an effective display area of said display screen, migrating the display of the preview window to the area of the enlarged effective display area that was previously displaying the active input area; and
   removing said preview window in response to a user selection outside of said preview window while said preview window is open.

2. A method as described in claim 1 further comprising, in response to a user navigation to a second highlighted appointment icon, automatically updating said preview window to display details of said second highlighted appointment icon on said display screen.

3. A method as described in claim 2 further comprising removing said preview window in response to a user selection while said preview window is open.

4. A method as described in claim 1 wherein said visually highlighting comprises:
- highlighting days of the week in response to left/right navigation; and
- highlighting appointments within a highlighted day in response to up/down navigation.

5. A computer system comprising:
- memory coupled to a bus;
- a processor coupled to said bus; and
- a display screen coupled to said bus, wherein said memory comprises instructions for implementing a method of displaying calendar information, said method comprising:
  - displaying a weekly view graphical image on a display screen, wherein said weekly view graphical image comprises days of the week and appointment icons therein;
  - associating the appointment icons to a category;
  - displaying only the appointment icons for a selected category;
  - wherein displaying only the appointment icons for a selected category further comprises:
  - displaying the appointment icon in a color that associates the appointment icon to the category;
  - visually highlighting appointment icons in response to user navigation input;
  - in response to a user selection of a first highlighted appointment icon, automatically displaying a preview window comprising details of said first highlighted appointment icon on said display screen, wherein said preview window is displayed simultaneously with said weekly view graphical image, said weekly view graphical remains user accessible while said preview window is open, said preview window is scrollable independent from said weekly view graphical image;
  - in response to the user collapsing an active input area for said display screen to enlarge an effective display area of said display screen, migrating the display of the preview window to the area of the enlarged effective display area that was previously displaying the active input area; and
  - removing said preview window in response to a user selection outside of said preview window while said preview window is open.

6. A computer system as described in claim 5 wherein said method further comprises, in response to a user navigation to a second highlighted appointment icon, automatically updating said preview window to display details of said second highlighted appointment icon on said display screen.

7. A computer system as described in claim 6 wherein said method further comprises removing said preview window in response to a user selection while said preview window is open.

8. A computer system as described in claim 5 wherein said visually highlighting comprises:
- highlighting days of the week in response to left/right navigation; and
- highlighting appointments within a highlighted day in response to up/down navigation.

9. A method of displaying calendar information comprising:
- displaying a monthly view graphical image on a display screen, wherein said monthly view graphical image comprises days of the month and appointment icons therein;
- associating the appointment icons to a category;
- displaying only the appointment icons for a selected category;
- wherein displaying only the appointment icons for a selected category further comprises:
- displaying the appointment icon in a color that associates the appointment icon to the category;
- visually highlighting days in response to user navigation input;
- in response to a user selection of a first highlighted day, automatically displaying a preview window comprising details of appointments of said first highlighted day on said display screen, wherein said preview window is displayed simultaneously with said monthly view graphical image, said monthly view graphical image remains user accessible while said preview window is open, said preview window is scrollable independent from said monthly view graphical image;
- in response to the user collapsing an active input area for said display screen to enlarge an effective display area of said display screen, migrating the display of the preview window to the area of the enlarged effective display area that was previously displaying the active input area; and
- removing said preview window in response to a user selection outside of said preview window while said preview window is open.

10. A method as described in claim 9 further comprising, in response to a user navigation to a second highlighted day, automatically updating said preview window to display details of appointments of said second highlighted day on said display screen.

11. A method as described in claim 10 further comprising displaying a full day view of said second highlighted day in response to a user selection provided said preview window is already open.

12. A method as described in claim 9 further comprising displaying a full day view of said first highlighted day in response to a user selection provided said preview window is already open.

13. A method as described in claim 9 wherein said visually highlighting comprises:
- highlighting days of the month across a common row in response to left/right navigation; and
- highlighting days of the month across a common column within a highlighted day in response to up/down navigation.

14. A computer system comprising:
- memory coupled to a bus;
- a processor coupled to said bus; and
- a display screen coupled to said bus, wherein said memory comprises instructions for implementing a method of displaying calendar information, said method comprising:
  - displaying a monthly view graphical image on said display screen, wherein said monthly view graphical image comprises days of the month and appointment icons therein;
  - associating the appointment icons to a category;
  - displaying only the appointment icons for a selected category;
  - wherein displaying only the appointment icons for a selected category further comprises:

displaying the appointment icon in a color that associates the appointment icon to the category;

visually highlighting days in response to a user navigation input;

in response to a user selection of a first highlighted day, automatically displaying a preview window comprising details of appointments of said first highlighted day on said display screen, wherein said preview window is displayed simultaneously with said monthly view graphical image, said monthly view graphical image remains user accessible while said preview window is open, said preview window is scrollable independent from said monthly view graphical image;

in response to the user collapsing an active input area for said display screen to enlarge an effective display area of said display screen, migrating the display of the preview window to the area of the enlarged effective display area that was previously displaying the active input area; and removing said preview window in response to a user selection outside of said preview window while said preview window is open.

15. A computer system as described in claim 14 wherein said method further comprises, in response to a user navigation to a second highlighted day, automatically updating said preview window to display details of appointments of said second highlighted day on said display screen.

16. A computer system as described in claim 15 wherein said method further comprises displaying a full day view of said second highlighted day in response to a user selection of said second highlighted day provided said preview window is already open.

17. A computer system as described in claim 14 wherein said method further comprises displaying a full day view of said first highlighted day in response to a user selection of said first highlighted day provided said preview window is already open.

18. A computer system as described in claim 14 wherein said visually highlighting comprises:

highlighting days of the month across a common row in response to left/right navigation; and highlighting days of the month across a common column within a highlighted day in response to up/down navigation.

* * * * *

UNITED STATES PATENT AND TRADEMARK OFFICE
CERTIFICATE OF CORRECTION

| | | |
|---|---|---|
| PATENT NO. | : 7,992,096 B1 | Page 1 of 1 |
| APPLICATION NO. | : 10/616091 | |
| DATED | : August 2, 2011 | |
| INVENTOR(S) | : Mark Davis | |

It is certified that error appears in the above-identified patent and that said Letters Patent is hereby corrected as shown below:

In column 11, line 30, delete "causes the" and insert -- causes the display of the month view as shown at 524. When there is one --, therefor.

In column 15, line 40, in Claim 5, delete "graphical remains" and insert -- graphical image remains --, therefor.

Signed and Sealed this
Fifth Day of June, 2012

David J. Kappos
*Director of the United States Patent and Trademark Office*